(12) United States Patent
Van Der Velde et al.

(10) Patent No.: US 11,234,225 B2
(45) Date of Patent: *Jan. 25, 2022

(54) METHOD AND SYSTEM FOR HANDLING OF SPECIAL SCELL SELECTION IN DUAL CONNECTIVITY

(71) Applicant: Samsung Electronics Co., Ltd., Suwon-si (KR)

(72) Inventors: Himke Van Der Velde, Zwolle (NL); Mangesh Abhimanyu Ingale, Bangalore (IN); Rajavelsamy Rajadurai, Bangalore (IN); Woo-Seong Kim, Gwacheon-si (KR); Neha Sharma, Bangalore (IN); Fasil Abdul Latheef, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,895

(22) Filed: Nov. 6, 2019

(65) Prior Publication Data
US 2020/0077385 A1 Mar. 5, 2020

Related U.S. Application Data

(63) Continuation of application No. 16/198,323, filed on Nov. 21, 2018, now Pat. No. 10,863,486, which is a
(Continued)

(30) Foreign Application Priority Data

Jan. 17, 2014 (IN) .............................. 202/CHE/2014
Mar. 26, 2014 (IN) ........................... 1606/CHE/2014

(51) Int. Cl.
*H04W 4/00* (2018.01)
*H04W 72/04* (2009.01)
(Continued)

(52) U.S. Cl.
CPC ......... *H04W 72/0413* (2013.01); *H04L 5/001* (2013.01); *H04L 5/0032* (2013.01);
(Continued)

(58) Field of Classification Search
None
See application file for complete search history.

(56) References Cited

U.S. PATENT DOCUMENTS 9,439,083 B2 9/2016 Lee et al.
10,117,170 B2 * 10/2018 Yi ........................ H04W 76/15
(Continued)

FOREIGN PATENT DOCUMENTS

CN 102938902 A 2/2013
CN 103517355 A 1/2014
(Continued)

OTHER PUBLICATIONS

Chinese Office Action dated Oct. 12, 2018, issued in Chinese Application No. 201580004990.9.
(Continued)

*Primary Examiner* — Gerald A Smarth
(74) *Attorney, Agent, or Firm* — Jefferson IP Law, LLP

(57) ABSTRACT

Method and system for handling of special SCell selection in dual connectivity. The present invention relates to the field of wireless communication networks and more particularly to a User Equipment (UE) operating in dual connectivity mode in wireless communication networks. The principal object of the embodiments herein is to provide a method and system for handling of special SCell (PSCell) change by extending Event A3 or Event A5 to PSCell for relative comparison. Another object of the invention is to provide a method and system for handling of special SCell (PSCell) change with a new Event Ax.

18 Claims, 25 Drawing Sheets

Related U.S. Application Data continuation of application No. 15/112,379, filed as application No. PCT/KR2015/000524 on Jan. 19, 2015, now Pat. No. 10,194,425.

(51) Int. Cl.

| | |
|---|---|
| *H04W 24/02* | (2009.01) |
| *H04L 5/00* | (2006.01) |
| *H04W 76/10* | (2018.01) |
| *H04W 74/08* | (2009.01) |
| *H04W 92/20* | (2009.01) |
| *H04W 88/06* | (2009.01) |

(52) U.S. Cl.
CPC .......... *H04L 5/0053* (2013.01); *H04W 24/02* (2013.01); *H04W 74/0833* (2013.01); *H04W 76/10* (2018.02); *H04W 88/06* (2013.01); *H04W 92/20* (2013.01)

(56) References Cited

U.S. PATENT DOCUMENTS

| | | | |
|---|---|---|---|
| 2009/0047955 A1* | 2/2009 | Frenger | H04J 11/0093 455/436 |
| 2012/0003943 A1 | 1/2012 | Marinier et al. | |
| 2012/0257513 A1* | 10/2012 | Yamada | H04L 1/1861 370/248 |
| 2012/0300657 A1 | 11/2012 | Jung et al. | |
| 2013/0329694 A1 | 12/2013 | Vrzic et al. | |
| 2014/0105056 A1* | 4/2014 | Li | H04W 52/0206 370/252 |
| 2014/0112184 A1* | 4/2014 | Chai | H04W 36/0085 370/252 |
| 2014/0119263 A1 | 5/2014 | Shauh et al. | |
| 2015/0092750 A1 | 4/2015 | Huang et al. | |
| 2015/0126154 A1 | 5/2015 | Yang | |
| 2015/0215799 A1* | 7/2015 | Kazmi | H04W 48/16 370/252 |
| 2015/0365857 A1* | 12/2015 | Wei | H04W 24/10 370/331 |
| 2016/0112913 A1 | 4/2016 | Malkamaki et al. | |
| 2017/0099621 A1 | 4/2017 | Michaelsen et al. | |

FOREIGN PATENT DOCUMENTS

| | | |
|---|---|---|
| WO | 2013/185579 A1 | 12/2013 |
| WO | 2014/000610 A1 | 1/2014 |

OTHER PUBLICATIONS

Sharp, Signalling Flow of SeNB Reconfiguration Procedure, 3GPP TSG-RAN WG2#84, Nov. 11-15, 2013, R2-134235, San Francisco, USA.

NEC, Discussion on PCell at SeNB in Dual Connectivity, 3GPP TSG RAN2 Meeting #84, Nov. 11-15, 2013, R2-134137, San Francisco, USA.

Interdigital Communications, Special Cell for SeNB with Dual Connectivity, 3GPP TSG-RAN WG2 #84, dated Nov. 11-15, 2013, R2-134398, San Francisco, USA.

European Search Report dated Aug. 8, 2017, issued in the European Application No. 15 73 7369.

Korean Office Action dated Jul. 7, 2016, issued in the Korean Application No. 10-2015-7020703.

R2-132750, 3GPP TS-GRAN WG2 #83, "Initial setup procedure for dual connectivity" Barcelona, Spain Aug. 19, 2013.

R2-132439, 3GPP TSG-RAN WG2 #83, "System Performance Benefits of Inter-eNB Resource Aggregation" Barcelona, Spain Aug. 19, 2013.

R1-135080, 3GPP TSG RAN WG1 Meeting #75, "Discussion on mechanisms for small cell ON/OFF" San Francisco, USA Nov. 11, 2013.

Broadcom Corporation, R2-133531, Mobility robustness with dual connectivity, 3GPP TSG RAN WG2 #83bis, 3GPP, Sep. 28, 2013.

Catt et al., R2-134053, RLM considerations for dual connectivity, 3GPP TSG RAN WG2 #84, 3GPP, Nov. 2, 2013.

Potevio, R2-132540, Measurement in dual connectivity, 3GPP TSG RAN WG2 #83, 3GPP, Aug. 9, 2013.

Korean Office Action dated Dec. 28, 2020, issued in Korean Application No. 10-2016-7022385.

3GPP, Technical Specification Group Radio Access Network; Evolved Universal Terrestrial Radio Access, (E-UTRA), Radio Resource Control (RRC), Protocol specification (release 10), #GPP TS 36.331 V 10.8.0, (P15521EP02-D5-XP 50691629A), Dec. 2012.

European Office Action dated Nov. 26, 2021, issued in European Application No. No. 201690385.

* cited by examiner

METHOD AND SYSTEM FOR HANDLING OF SPECIAL SCELL SELECTION IN DUAL CONNECTIVITY

CROSS-REFERENCE TO RELATED APPLICATION(S)

This application is a continuation application of prior application Ser. No. 16/198,323, filed on Nov. 21, 2018, which is a continuation application of prior application Ser. No. 15/112,379, filed on Jul. 18, 2016, which issued as U.S. patent Ser. No. 10/194,425, which is a U.S. National Stage application under 35 U.S.C. § 371 of an International application number PCT/KR2015/000524, filed on Jan. 19, 2015, which is based on and claimed priority of an Indian patent application number 202/CHE/2014, filed on Jan. 17, 2014, in the Indian Intellectual Property Office and of an Indian patent application number 1606/CHE/2014, filed on Mar. 26, 2014 in the Indian Intellectual Property Office, the disclosure of each of which is incorporated by reference herein in its entirety.

TECHNICAL FIELD

The present invention relates to the field of wireless communication networks and more particularly to a User Equipment (UE) operating in dual connectivity mode in wireless communication networks.

BACKGROUND ART

With rise in deployment of Long Term Evolution (LTE) and LTE advanced (LTE-A), small cells using low power nodes such as Pico cells and Femto cells are considered promising to cope with mobile traffic explosion. A small cell using a low power node, which has transmission power (Tx) lower than a macro node and Base Station (BS) classes is preferred for hotspot deployments in indoor and outdoor scenarios resulting in enhanced performance.

The small cell enhancement for Evolved Universal Mobile Telecommunication System (UMTS) Terrestrial Radio Access Network (E-UTRAN) and E-UTRA focuses on additional functionalities for enhanced performance in hotspot areas for indoor and outdoor using the low power nodes.

3GPP ($3^{rd}$ Generation Partnership Project) is considering use of potential higher layer technologies for enhanced support of small cell deployments in E-UTRA (Evolved UMTS (Universal Mobile Telecommunications System) Terrestrial Radio Access) and E-UTRAN (Evolved UMTS Terrestrial Radio Access Network) to fulfill the deployment scenarios and the requirements specified in TR 36.932.

3GPP is considering a deployment scenario, in which different frequency bands are separately assigned to macro layer and small cell layer, respectively. Small cell enhancement is expected to support significantly increased user throughput for both downlink and uplink with main focus on typical user throughput considering a reasonable system complexity. Small cell enhancement is expected to target the capacity per unit area (e.g. bps/km2) to be as high as possible, for a given user and small cell distribution, typical traffic types and considering a reasonable system complexity. The small cell enhancements are also expected to consider the impact of the actual backhaul delays and provide solutions with the aim of improved system performance. Other aspects, for example service quality of VoLTE (Voice over LTE (Long Term Evolution)) (e.g. MOS (Mean Opinion Score)) and delay/jitter impacts on services (video streaming, video calls and so on), could also be addressed later.

In LTE Release-10 carrier aggregation, all the component carriers involved in carrier aggregation is handled at the same eNB (co-located) and the component carriers are from the same frequency band i.e. intra-band carrier aggregation. In LTE Release-11 specification supports inter-band carrier aggregation where the component carriers are from different frequency bands. In the inter-band carrier aggregation scenario, the component carrier (F1) from a lower frequency band can provide coverage and mobility whereas the other component carrier (F2) from a higher frequency band can provide high throughput to the UE. The inter-band carrier aggregation could be non-co-located, where the UE is carrier aggregated with at least one first serving frequency by a Master eNodeB (MeNB) and at least one second serving frequency served by a Secondary eNB (SeNB). When carrier aggregation between at least one cell controlled by two geographically separated eNBs is envisioned then it is called as inter-eNB carrier aggregation and the UE is said to be configured with dual connectivity mode of operation. In such a scenario, dual connectivity is envisioned such that the UE maintains physical links with at least one cell controlled by two geographically separated eNBs. The UE maintains dual connectivity both in downlink and uplink or only downlink. In uplink the dual connectivity towards the MeNB and the SeNB could be simultaneous or could be time multiplexed.

In the so-called dual connectivity mode of operation, the UE consumes radio resources provided by two different network nodes (i.e. MeNB associated with at least one first serving frequency and SeNB associated with at least one second serving frequency) connected via a non-ideal backhaul interface (X2 interface). The MeNB also called first eNB is responsible for managing the resources i.e. carriers or cells belonging to MeNB referred as Master Cell Group (MCG). The MeNB is the eNB which hosts the Radio Resource Control (RRC) layer and a single S1-MME termination point exists for an UE configured with dual connectivity mode of operation between the Mobile Management Entity (MME) and the E-UTRAN. The MeNB therefore acts as a mobility anchor towards the core network (CN). The SeNB (also called second eNB) is an eNB providing additional radio resources for the UE. The SeNB is responsible for managing the resources i.e. carriers or cells belonging to SeNB referred as Secondary Cell Group (SCG). The eNB configured as SeNB for a given UE could also be operated as a normal LTE cell for standalone UEs. The E-UTRAN architecture and related functions to support Dual Connectivity for E-UTRAN is further described in TS 36.300.

The standard procedure for the intra-frequency and inter-frequency LTE (i.e. handover between LTE cells) handover in LTE specification (i.e. 3GPP TS 36.331) is described herein.

An event A1 is triggered when the signal strength of the serving cell (wherein the UE is connected to the serving cell), which is measured by the UE, greater than a threshold value.

An event A2 is triggered when the signal strength of the serving cell, which is measured by the UE, is less than a threshold value, wherein the UE is connected to the serving cell, but the signal strength of the serving cell is not strong enough.

An event A3 is triggered when the signal strength of a neighboring cell (managed by the same or a different eNB)

is greater than that of the serving cell and the difference between the signal strengths of the serving cell and the neighbor cell is greater than a predefined offset. If the event A3 is detected, the UE predicts that a handover will occur in the near future. Event A3 is applicable for both intra-frequency and inter-frequency LTE cells for relative comparison.

An event A4 is triggered when the signal strength of the neighboring cell (managed by same or a different eNB), which is measured by the UE, is greater than a threshold value.

An event A5 is triggered when the signal strength of the serving cell is less than a predefined first threshold value and the signal strength of a neighboring cell (managed by same or a different eNB) is greater than a predefined second threshold value. Here, the first threshold value can be less than the second threshold value. Event A5 triggering is expected when the UE is moving out of the source cell and entering a neighboring cell. If the event A5 is detected, the neighboring cell (managed by same or a different eNB) becomes the target eNB for a handover such that the User Equipment (UE) detaches from the serving cell. Event A5 is applicable for both intra-frequency and inter-frequency cells for relative comparison.

Furthermore, in multi-carrier LTE i.e. LTE operation in carrier aggregation (CA) mode specified in LTE Release-10 specification, a new measurement event have been defined as Event A6 (intra-frequency neighbor becomes offset better than Serving Cell, on secondary carrier). With this event, it is possible to evaluate the relative strength of cells on a carrier, where the concerned carrier does not have to be the primary carrier managed by the primary serving cell, or PCell. With this event, the network can make a cell change on the secondary LTE carrier.

According to 3GPP specification TS 36.300 for control plane (C-plane) architecture in dual connectivity there is no termination for the RRC (Radio Resource Control) protocol in the SeNB towards the UE. In inter-eNB carrier aggregation employing dual connectivity, the configuration of cell(s) (carriers) that belongs to the SeNB can be provided by the MeNB depending on data demand from the UE and the signal strength of the SCG cells. The SCG cells are secondary cells (SCells) similar to SCells in Rel-10 CA. The UE needs to do synchronization towards the SCG cells since the SeNB is geographically separated. Since the RRC layer is only sitting in the MeNB, the MeNB is responsible for radio resource management and associated measurement configuration both for the MCG cells and SCG cells.

Similar to Rel-10 CA, for dual connectivity mode of operation of the UE, the primary cell (PCell) of the UE belongs to the MCG. UE can be configured with additional SCell(s) served by a set of frequencies in the MCG. The set of frequencies handled by the MeNB are referred to as a first set of frequencies. There can be at least one serving cell for the UE associated with a first serving frequency served by the MeNB. Within the SCG, the UE does not have PCell, but a cell having similar functionality like the PCell is configured to the UE. This special SCell within the SCG is called special SCell (pSCell or PSCell) where PUCCH resources are configured. The special SCell or PSCell in the SCG configured for the UE is used for transmission of HARQ feedback for PDSCH scheduled on SCG SCells and also the CQI reports for concerned SCG SCells over the configured PUCCH resources. UE can be configured with additional SCell(s) in the SCG served by a set of frequencies different from the first set of frequencies. The set of frequencies handled by the SeNB are called second set of frequencies.

There is at least one serving cell for the UE associated with a second serving frequency served by the SeNB. Furthermore, the SCells within the MCG and SCG do not have PUCCH (Physical Uplink Control Channel) configuration but can provide additional PUSCH resources to the UE. The configuration of pSCell/PSCell for the UE within the SCG can be any of the configured SCells within the SCG. Assuming that SeNB is handling more than one SCell and each SCell on a different frequency, the Event A6 cannot be used for special SCell (pSCell/PSCell) change configured for the UE since Event A6 is only applicable for intra-frequency measurements. Further, Events A2 and Event A4 cannot be used because they cannot be used for relative comparison of signal strength, they can be used only for addition/removal of the carrier.

Furthermore, Events A3 and A5 cannot be used because currently these events are applicable only for the PCell. Hence in the above mentioned scenario for a UE configured with dual connectivity mode of operation, handling of special SCell (pSCell/PSCell) change cannot be done using any of the above described events.

Therefore, for inter-eNB carrier aggregation i.e. dual connectivity mode of operation, the extension of measurement events A3 and A5 or new measurement event for relative inter-frequency comparison requires new RRC signaling between the UE and the MeNB.

When a plurality of Secondary Cells (SCell) are added simultaneously by the MeNB during SCG establishment, there is a need to decide/determine specific parameters of which SCell (i.e. a reference cell) are used for deriving a SeNB key by the MeNB. The indication of the reference SCell decision/determination needs to be conveyed to the UE by the MeNB to enable the UE to derive the same SeNB key. A suitable entity should be configured to decide the reference cell namely the special SCell (pSCell) whose cell-specific parameters such as physical cell identity (PCI) and/or downlink frequency (DL-EARFCN) are to be used for KeNB key derivation. The special SCell (pSCell or PSCell) seems a good candidate to be used as reference cell since the PSCell has some of the properties of primary cell (PCell) defined in 3GPP specification TS 36.300 and TS 36.331.

The identification/determination or selection of pSCell/PSCell can affect the SCG establishment and handover (HO) procedures involving the MeNB. The selection of the pSCell/PSCell is an issue that can require some coordination between MeNB and SeNB when making decision, which SCell within the SCG can be the pSCell/PSCell. The RRM measurements from the UE indicate the relative radio link quality of the plurality of SCells, which can be added during SCG establishment. The RRM measurements can be received from the UE through measurement report or some feedback from the UE. In general it would be preferable for the SeNB to control the SCG configuration as much as possible; it can be good to consider how this objective could be realized.

The SeNB can decide the special SCell (pSCell/PSCell) from the plurality of SCells added by the MeNB during SCG establishment. The SeNB can randomly decide the pSCell/PSCell from the plurality of SCells added or the SeNB can decide the pSCell/PSCell based on the physical resource availability i.e. taking the load information into account in the plurality of SCells.

If it is also required that the SeNB identified/determined or selected pSCell/PSCell has to meet an additional radio link quality criterion, then the MeNB needs to be involved, as MeNB handles the RRM measurements of the UE. The MeNB could assist the SeNB with measurement information i.e. by providing the SeNB with a list of SCG cells meeting the pSCell/PSCell measurement criterion (i.e. the set of SCells from which the SeNB can make a selection of pSCell/PSCell based on resource availability).

Therefore, for inter-eNB carrier aggregation i.e. dual connectivity mode of operation, the assistance procedures by which one eNB provides either RRM measurement results or a list of candidate pSCell/PSCell, as discussed above, the information exchange is considered with new signaling support on the X2 interface between the MeNB and SeNB.

Apart from this the SON (Self-Optimizing Network) related reports sent by the UE to network (eNB) are pertaining to the procedural reports and failure reports of the PCell (MeNB) and not the pScell/PSCell (special cell of SeNB). There is a need to enhance the existing reports for SON, which will provide information to SeNB through MeNB. The information exchange is considered with new signaling support on the X2 interface between the MeNB and SeNB.

In addition to this UE also need to provide UE capability to SeNB and also there is need to define new Feature Group indicator (FGI) for SeNB. The UE can provide this information to the MeNB, which can be further shared to the SeNB through the X2 interface.

The above information is presented as background information only to help the reader to understand the present invention. Applicants have made no determination and make no assertion as to whether any of the above might be applicable as Prior Art with regard to the present application.

DISCLOSURE

Technical Solution

The principal object of the embodiments herein is to provide a method and system for selection of special SCell (pSCell/PSCell) by the SeNB from a plurality of SCells configured for a UE in the SCG.

Another object of invention is to provide a method and system for handling of special SCell (pSCell/PSCell) change for a UE by extending Event A3 or Event A5 to pSCell/PSCell for relative comparison.

Another object of the invention is to provide enhancement in measurement by defining new functionalities for existing events.

Another object of the invention is to provide a method and system for handling of special SCell (pSCell/PSCell) change for a UE with introduction of a new Event Ax.

Another object of invention is to provide a method and system for information exchange related to RRM measurements on X2 interface to enable selection of best target pSCell/PSCell in case multiple SCells configured for the UE have met the configured measurement events.

Another object of the invention is to provide a method and system to control mobility by linking the multiple events configured for the UE to enable handling of special SCell (pSCell/PScell) in dual connectivity and handovers in Heterogeneous networks (HetNet) deployments.

Another object of the invention is to provide a method and system for information exchange related to Self-optimizing Network (SON) on X2 interface to enable SON enhancements and new SON feature for dual connectivity.

Another object of the invention is to provide the method to exchange of UE capabilities between the MeNB and the SeNB over X2 interface and defining new FGI bit for SeNB.

Accordingly the invention provides a method for managing selection of a cell configured with Physical Uplink Control Channel (PUCCH) resources for a User Equipment (UE) operating in a dual connectivity mode of operation in a wireless communication network, the wireless communication network comprising of a first evolved NodeB (eNB) connected to a second eNB by an X2 interface, the method comprising sending a Radio Resource Control (RRC) message for measurement configuration by the first eNB to the UE for at least one configured frequency, wherein the configured frequency is distinct from at least one first serving frequency served by the first eNB; evaluating measurement events by the UE based on the measurement configuration; sending radio resource management (RRM) measurement results to the first eNB by the UE on at least one the configured measurement event being triggered for the at least one the configured frequency apart from the at least one first serving frequency served by the first eNB wherein the RRM measurement results comprises at least one of Reference Signal Received Power (RSRP) and Reference Signal Received Quality (RSRQ); and initiating a procedure towards the second eNB by the first eNB for configuring the UE with dual connectivity mode of operation over the X2 interface with at least one second serving frequency to be served by the second eNB based on the RRM measurement results for the at least one the configured frequency received from the UE apart from the at least one first serving frequency served by the first eNB.

Accordingly provided herein is a wireless communication network comprising of a first evolved NodeB (eNB) connected to a second eNB by an X2 interface and at least one User Equipment (UE), configured for managing selection of a cell configured with Physical Uplink Control Channel (PUCCH) resources for the User Equipment (UE) operating in a dual connectivity mode of operation in the wireless communication network, wherein the first eNB is configured for sending a Radio Resource Control (RRC) message for measurement configuration to the UE for at least one configured frequency, wherein the configured frequency is distinct from at least one first serving frequency served by the first eNB; the UE configured for evaluating measurement events based on the measurement configuration; and sending radio resource management (RRM) measurement results to the first eNB on at least one the configured measurement event being triggered for the at least one the configured frequency apart from the at least one first serving frequency served by the first eNB wherein the RRM measurement results comprises at least one of Reference Signal Received Power (RSRP) and Reference Signal Received Quality (RSRQ); and the first eNB further configured for initiating a procedure towards the second eNB for configuring the UE with dual connectivity mode of operation over the X2 interface with at least one second serving frequency to be served by the second eNB based on the RRM measurement results for the at least one the configured frequency received from the UE apart from the at least one first serving frequency served by the first eNB.

Accordingly provided herein is a first evolved NodeB (eNB) in a wireless communication network, wherein the first eNodeB is connected to a second eNB by an X2 interface and at least one User Equipment (UE) and the User Equipment (UE) is operating in a dual connectivity mode of operation in the wireless communication network, the first eNB configured for sending a Radio Resource Control (RRC) message for measurement configuration to the UE for at least one configured frequency, wherein the configured frequency is distinct from at least one first serving frequency served by the first eNB; initiating a procedure towards the second eNB for configuring the UE with dual connectivity mode of operation over the X2 interface with at least one second serving frequency to be served by the second eNB based on radio resource management (RRM) measurement results for the at least one configured frequency received from the UE apart from the at least one first serving frequency served by the first eNB, wherein the RRM measurement results are received from the UE on at least one configured measurement event being triggered for the at least one the configured frequency apart from the at least one first serving frequency served by the first eNB and the RRM measurement results comprises at least one of Reference Signal Received Power (RSRP) and Reference Signal Received Quality (RSRQ).

Provided herein is a second evolved NodeB (eNB) in a wireless communication network, wherein the second eNodeB is connected to a first eNB by an X2 interface and at least one User Equipment (UE) and the User Equipment (UE) is operating in a dual connectivity mode of operation in the wireless communication network, the second eNB configured for receiving a procedure from the first eNB for configuring the UE with dual connectivity mode of operation over the X2 interface with at least one second serving frequency to be served by the second eNB based on radio resource management (RRM) measurement results for the at least one configured frequency received from the UE apart from the at least one first serving frequency served by the first eNB, wherein the RRM measurement results are received from the UE on at least one configured measurement event being triggered for the at least one the configured frequency apart from the at least one first serving frequency served by the first eNB wherein the RRM measurement results comprises at least one of Reference Signal Received Power (RSRP) and Reference Signal Received Quality (RSRQ).

Provided herein is a User Equipment connected to a wireless communication network, the wireless communication network comprising of a first evolved NodeB (eNB) connected to a second eNB by an X2 interface and the User Equipment (UE) is operating in a dual connectivity mode of operation in the wireless communication network, the UE further configured for receiving a Radio Resource Control (RRC) message for measurement configuration from the first eNodeB for at least one configured frequency, wherein the configured frequency is distinct from at least one first serving frequency served by the first eNB; evaluating measurement events based on the measurement configuration; sending radio resource management (RRM) measurement results to the first eNB on at least one the configured measurement event being triggered for the at least one the configured frequency apart from the at least one first serving frequency served by the first eNB wherein the RRM measurement results comprises at least one of Reference Signal Received Power (RSRP) and Reference Signal Received Quality (RSRQ); and receiving a RRC connection reconfiguration message from the first eNB for configuring the UE for the dual connectivity mode of operation comprising configuration for at least one second serving frequency served by the second eNB including information concerning the serving cell configured with the PUCCH resources on at most one the second serving frequency for the UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications can be made within the scope of the embodiments herein without departing from the spirit thereof, and the embodiments herein include all such modifications.

DESCRIPTION OF DRAWINGS

This invention is illustrated in the accompanying drawings, throughout which like reference letters indicate corresponding parts in the various figures. The embodiments herein will be better understood from the following description with reference to the drawings, in which.

MODE FOR INVENTION

Figure 1:
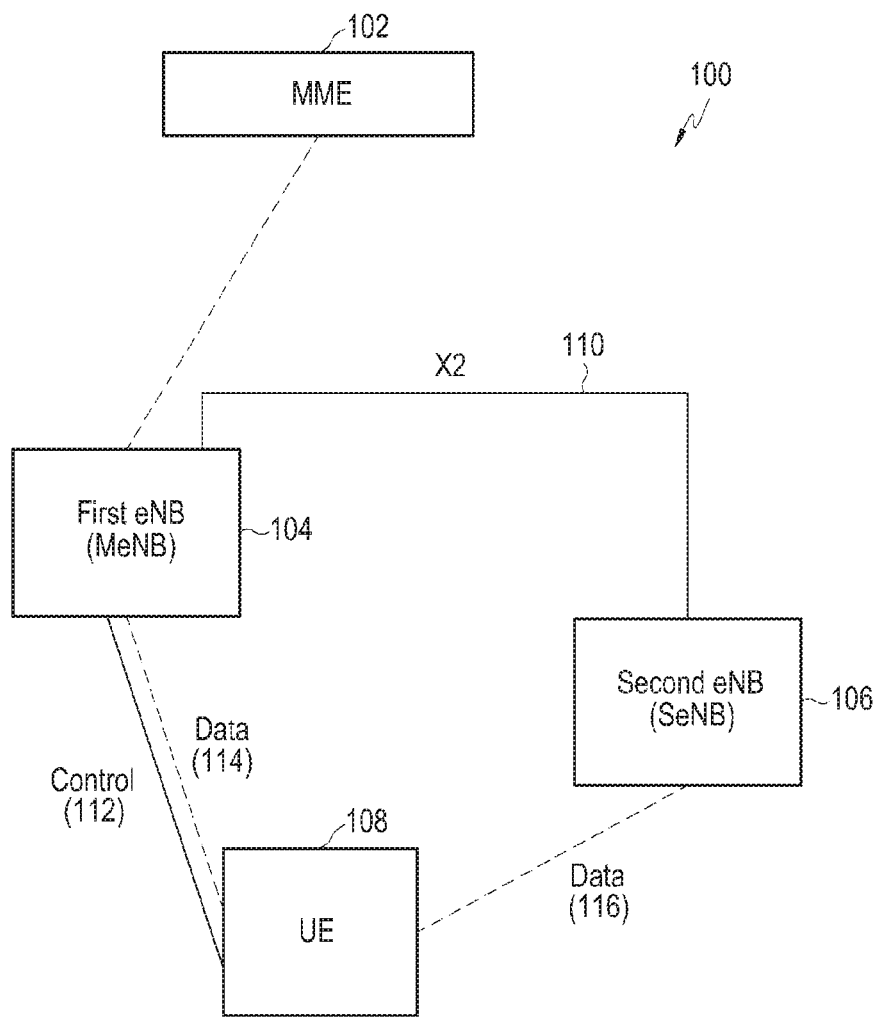
FIG. 1 is a block diagram illustrating an inter-evolved node B (eNB) carrier aggregation in a wireless communication network system such as that of 3GPP's Long Term Evolution (LTE), according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The terms "first evolved Node B" (first eNB), "Master eNB (MeNB)", "primary eNB", and "anchor eNB" have been used interchangeably herein and can refer to a single eNB, which connects a User Equipment (UE) to the core network (which terminates at least S1-MME interface). A group of cells handled by the MeNB is referred to herein as Master Cell Group (MCG).

Throughout the document, the terms "second eNB", "Secondary eNB (SeNB)", "small eNB", "slave eNB" and "Drift eNB" have been used interchangeably and the terms can refer to an eNB that serves the UE to enhance data throughput at the UE (but not the MeNB). A group of cells handled by the SeNB is referred to herein as Secondary Cell Group (SCG).

Throughout the document, the term "serving cell configured with PUCCH resources", "Special SCell", "PSCell" and "pSCell" have been used interchangeably and can refer to at most one SCell from a plurality of SCG SCells served by the SeNB.

Embodiments herein provide a method and system for selection of a special SCell (pSCell/PSCell) by the SeNB from a plurality of SCells configured for a UE in the SCG. Information exchange related to radio resource management (RRM) measurements on X2 interface when multiple SCells configured for the UE have met the configured measurement events is provided to enable selection of best target pSCell/PSCell.

In an embodiment, the SeNB determines/selects the PSCell from the plurality of SCells added by the MeNB during SCG establishment. The SeNB can randomly decide the PSCell from the plurality of SCells added or the SeNB can decide the PSCell based on the physical resource availability i.e. taking the load information into account in the plurality of SCells.

In an embodiment, if it is also required that the SeNB identified/determined or selected PSCell has to meet an additional radio link quality criterion, then the MeNB handles the RRM measurements of the UE. The MeNB can assist the SeNB with measurement information, i.e. by providing the SeNB with a list of SCG cells meeting the PSCell measurement criterion (i.e. the set of SCells from which the SeNB can make a selection of PSCell based on resource availability i.e. taking the load information into account in the plurality of SCells).

Embodiments herein provide a method and system for handling of special SCell (PSCell) change by extending Event A3 or Event A5 to PSCell. Event A3 and A5 are extended for special SCell, such that it can be used to change and/or determine the current Special SCell of SeNB from a plurality of SCG SCells. Further, the method and system provides handling of special SCell (PSCell) change with a new Event Ax defined for relative comparison of inter-frequency measurements.

In an embodiment, a measurement report triggered by an Event Ax (i.e. an event for inter-frequency comparison) indicates to network that a new component carrier (CC) within the SCG is better than the special SCell and that this new cell (CC) can now be made as the new special SCell. The network can further change the special cell of SeNB based on this event.

Embodiments herein also provide SON enhancements for dual connectivity, linking of multiple events and enhanced functionality for the existing events.

Referring now to the drawings, and more particularly to FIGS. 1 through 16, where similar reference characters denote corresponding features consistently throughout the figures, there are shown preferred embodiments.

FIG. 1 is a block diagram illustrating an inter-evolved node B (eNB) carrier aggregation in a wireless communication network system 100 such as that of 3GPP's Long Term Evolution (LTE), according to embodiments as disclosed herein. The wireless communication network system 100 includes a Mobility Management Entity (MME) 102, a first eNB (MeNB) 104, a second eNB (SeNB) 106, and a User Equipment (UE) 108 with inter-eNB carrier aggregation. The MME 102 manages session states, authentication, paging, mobility with 3GPP, 2G and 3G nodes, roaming, and other bearer management functions. The UE 108 can be a mobile phone, a tablet, a wearable computing device, a communication dongle or any other device capable of connecting and communicating over a wireless communication network system 100. The UE 108 can be capable of operating in a dual connectivity mode of operation simultaneously connected to the MeNB 104 and the SeNB 106.

The MeNB 104 can be a macro eNB, a primary eNB, a first eNB, a anchor eNB or any other eNB capable of being a part of a wireless communication network system 100 and serving at least one cell served on a first carrier frequency (F1) to the UE 108. The SeNB 106 can be a secondary eNB, a small eNB, a drift eNB or any other eNB capable of being a part of a wireless communication network system 100 and serving at least one cell served on a second carrier frequency (F2) to the UE 108. The MeNB 104 and SeNB 106 can be parts of the same wireless communication network system 100 and can be connected to each other at the backend through a non-ideal backhaul such as X2 interface 110 and communicate using the X2 application protocol (X2-AP). The UE 108 can be configured to connect to at least one of the MeNB 104 and SeNB 106 using suitable air interfaces. There can be a plurality of SeNBs and MeNBs present in the wireless communication network system 100. The wireless network system 100 is only one example of a suitable environment and is not intended to suggest any limitation as to the scope of use or functionality of the invention.

In an embodiment, the MeNB 104 is connected to the SeNB 106 with an interface characterized by one of a non-ideal backhaul link and an ideal backhaul link. The UE 108 is carrier aggregated with at least one first serving frequency (F1) served by the MeNB 104 and at least one second serving frequency (F2) served by the SeNB 106 and configured to operate in dual connectivity mode of operation in at least one of a downlink direction and an uplink direction with the MeNB 104 and the SeNB 106. In an embodiment, the wireless network system uses a set of data radio bearers (DRBs) for the UE 108 that is transmitted over the MeNB 104, while another set of data radio bearers (DRBs) for the UE 108 is transmitted over the SeNB 106. When the MeNB 104 and the SeNB 106 serve the UE 108, the MeNB 104 handles the control plane 112 of the UE 108, while the user plane or data plane 114 and 116 handling of the UE 108 gets either distributed or split between the MeNB 104 and the SeNB 106.

Figure 2A:
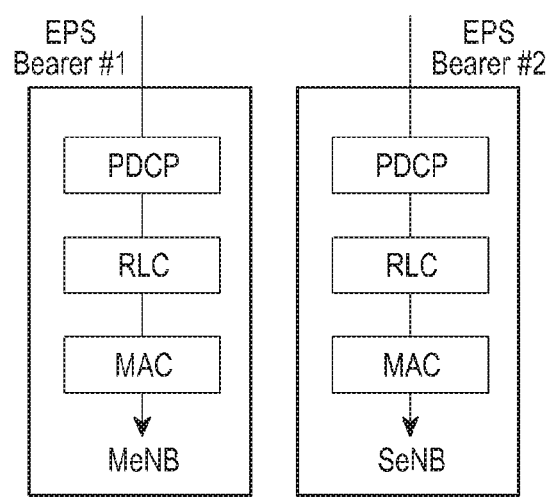
FIGS. 2a and 2b illustrate the user plane architecture options at the nodes involved in dual connectivity mode of operation.

FIG. 2 illustrates protocol architectures for dual connectivity under consideration in 3GPP specification TR 36.842, according to embodiments as disclosed herein. The FIG. 2a illustrates a core network (CN) split architecture from eNB perspective, according to embodiments as disclosed herein. As shown in the FIG. 2a, the S1-U terminates at the MeNB 104 and the SeNB 106. This architecture is referred as core network (CN) split where a set of Evolved Packet System (EPS) bearers of the UE 108 are split in the core network at the Service-Gateway (S-GW) and the EPS bearers are mapped on the respective S1-U interfaces towards the MeNB 104 and the SeNB 106. The respective EPS bearers are mapped on to corresponding data radio bearers (DRBs) of the MeNB 104 and the SeNB 106.

Figure 2B:
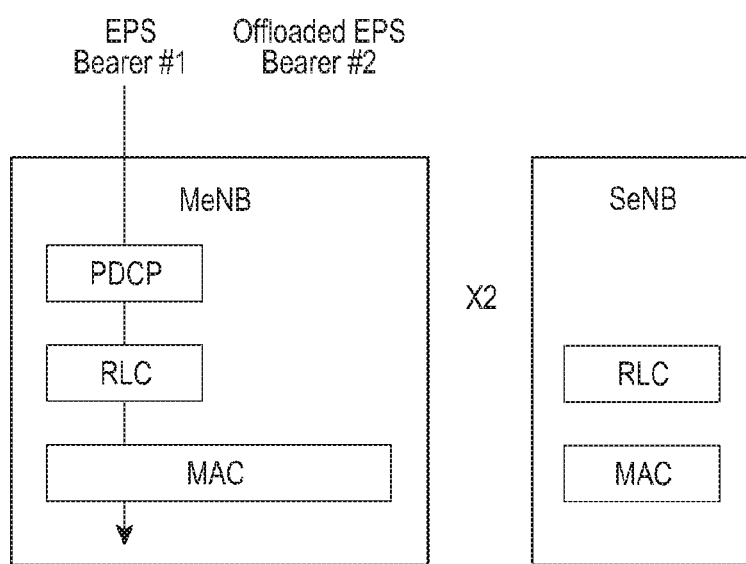

The FIG. 2b illustrates Radio Access Network (RAN) split architecture from eNB perspective, according to embodiments as disclosed herein. As shown in the FIG. 2b, the S1-U terminates only at the MeNB 104. This architecture is referred as radio access network (RAN) split where the EPS bearer #2 of the UE 108 is split in the MeNB 104 and the offloaded bearer is mapped on the X2 interface 110 towards the SeNB 106. The layer 2 protocol stack for the data radio bearer associated with the MeNB 104 (EPS Bearer #1 and Split EPS Bearer #2) and the SeNB 106 (Offloaded EPS Bearer #2) includes an independent PDCP entity per bearer at the MeNB 104, an independent Radio Link Control (RLC entity) per bearer at the MeNB 104 and the SeNB 106, and a common Medium Access Control (MAC) entity at the MeNB 104 and an independent MAC entity at the SeNB 106. The split/offloaded data radio bearer associated with the MeNB 104 (EPS Bearer #2) and also associated with the SeNB 106 can be handled by the PDCP entity associated with MeNB 104 called the common PDCP entity. Further, the MeNB 104 includes an RRC protocol for control signaling 112. The layer 2 protocol stack associated with the MeNB 104 and the SeNB 106 for handling the data radio bearers associated with the MeNB 104 and the SeNB 106 which includes the MAC entity, the RLC entity, and the PDCP entity as shown in FIG. 2a and FIG. 2b is also duplicated at the UE 108 from the UE perspective and hence not shown explicitly for simplicity.

Figure 3A:
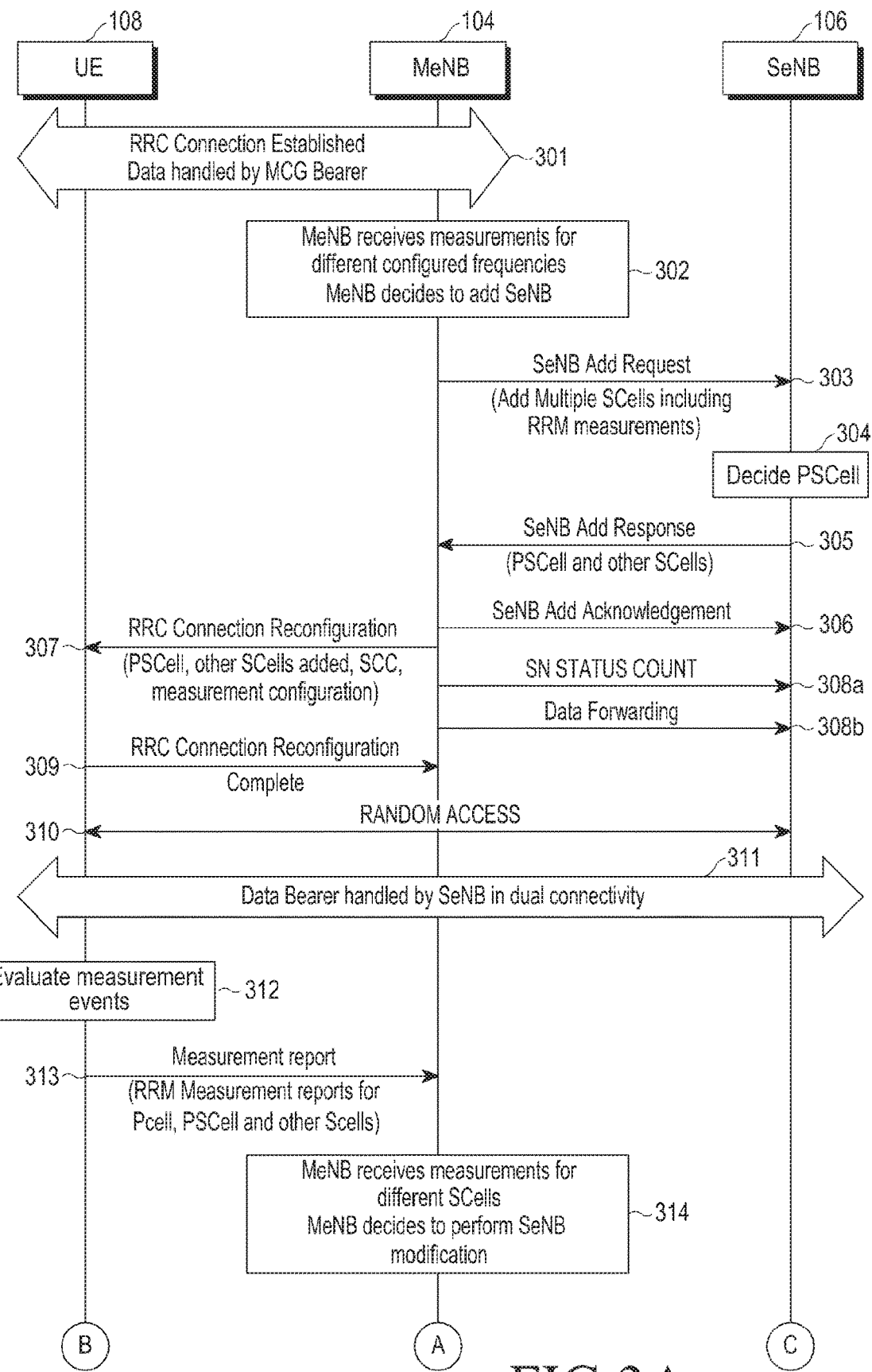
FIGS. 3a and 3b are flow diagrams illustrating an exemplary process of performing selection of a cell configured with Physical Uplink Control Channel (PUCCH) resources for the UE operating in a dual connectivity mode of operation, according to embodiments as disclosed herein.
Figure 3B:
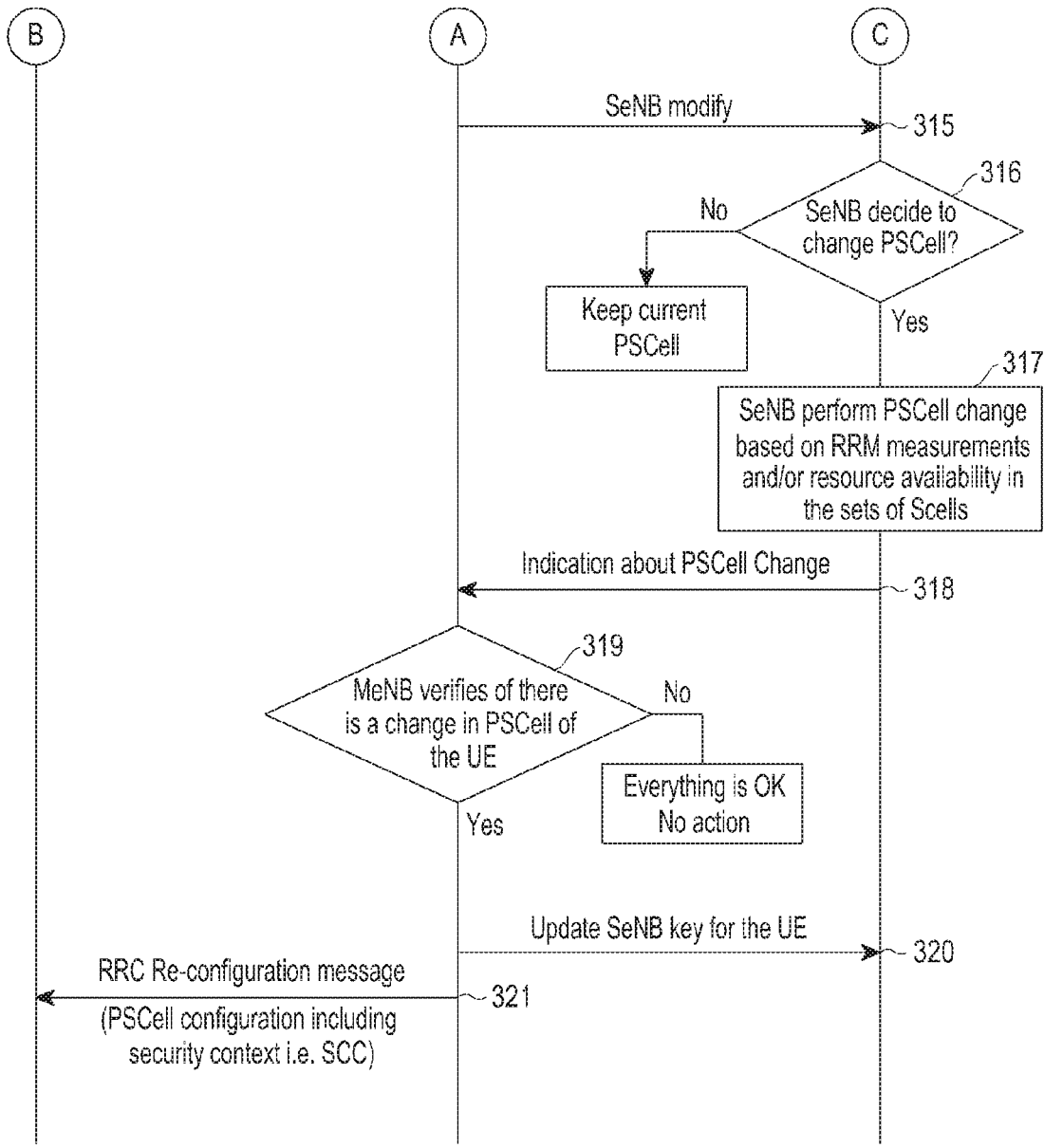

FIGS. 3a and 3b are flow diagrams illustrating an exemplary process of performing selection of PSCell i.e. a cell configured with Physical Uplink Control Channel (PUCCH) resources for the UE operating in a dual connectivity mode of operation, according to embodiments as disclosed herein. At step 310, the UE 108 establishes RRC connection with the MeNB 104 and UE 108. The UE 108 performs user plane data exchange with the MeNB 104 on the data radio bearers established by the MeNB 104 i.e. the MCG bearer(s) handle the data. The UE 108 performs RRM measurements at least one of Reference Signal Received Power (RSRP) and Received Signal Received Quality (RSRQ) for plurality of frequencies, which have been configured at the UE 108 based on the measurement configuration provided by the MeNB 104 in step 301. The MeNB 104 receives the RRM measurements for a plurality of frequencies from the UE 108 at step 302. The plurality of configured frequencies include the serving cell(s) associated with a first set of frequencies served by the MeNB 104 and neighbor cell(s) associated with a second set of frequencies served by the SeNB 106, wherein frequencies in the first set and second set can belong to the same band or can belong to different bands. There is at least one cell served by the MeNB 104 served by a first frequency and the cell on which the UE establishes the RRC connection in step 301 is called the PCell of the UE 108. The other cells configured for the UE 108 handled by the MeNB 104 are secondary cells (SCells) and henceforth referred as Master Cell Group (MCG) including the PCell. Based on the received measurement results for the second set of frequencies and if the data demand for the UE 108 increases then, the MeNB 104 makes a decision on whether to add an SeNB 106 with at least one SCell associated with a second frequency served by the SeNB 106. The SeNB 106 is added on the MeNB 104 making a decision to add SeNB 106 by sending an add request X2 message to the SeNB 106 on the X2 interface 110, as in step 303. In an embodiment herein, the MeNB 104 can add multiple SCells, including the corresponding RRM measurements associated with added SCells. Based on the received add request if the X2 message includes only one SCell then, the SeNB 106 by default decides the added SCell as the PSCell for the UE 108 at step 304. In an embodiment herein, if multiple SCells are received in the add request message then, the SeNB 106 decides the PSCell for the UE 108 from the second set of frequencies based on the associated RRM measurement results (received in a X2 message from the MeNB 104 over the X2 interface) and load information (i.e. physical resource availability for PUCCH) associated with the set of frequencies assessed by the SeNB 106. In yet another embodiment, the SeNB 106 can also determine the PSCell for the UE 108 in a random manner. In one example the determination is from the plurality of SCG SCells such that PUCCH load is uniformly distributed across the SCG SCells for the UE population density served by the SeNB 106. There can be at least one cell served by the SeNB 106 served by a second frequency and the cell on which the PUCCH resources are configured for the UE 108 is called the PSCell of the UE. The other cells configured for the UE 108 handled by the SeNB 106 are secondary cells (SCells) and henceforth referred as Secondary Cell Group (SCG) including the PSCell. On deciding the PSCell to be configured to the UE 108, the SeNB 106 sends an add response to the MeNB 104 over the X2 interface at step 305, wherein the add response comprises of configuration information related to the PSCell such as PUCCH configuration and E-UTRA Absolute Radio Frequency Channel Number (EARFCN) associated with the PSCell and other SCells and their corresponding EARFCNs served by the SeNB 106. In an embodiment herein, the response message comprises configuration for at least one second serving frequency served by the SeNB 106 including information concerning the serving cell configured with the PUCCH resources on at most one second serving frequency for the UE 108. On receiving the add response from the SeNB 106, at step 306 the MeNB 104 sends an X2 message with acknowledgement to the SeNB 106. The MeNB 104 derives the security base key associated with SeNB 106 for UE 108 using at least one of a freshness parameter (i.e. SCG Counter) and cell-specific parameters of the PSCell. The acknowledgement message 306 includes the security base key associated with the SeNB 106 for the UE 108, derived by the MeNB 104. The MeNB 104 sends a RRC Connection Reconfiguration message 307 to the UE 108, wherein the Reconfiguration message comprises of information related to at least the PSCell configuration, SCG Counter (SCC), configuration of other SCells added, measurement configurations and so on. In an embodiment herein, the RRC connection reconfiguration message comprises configuration for at least one second serving frequency served by the SeNB 106 including information concerning the serving cell configured with the PUCCH resources on at most one second serving frequency for the UE 108. In an embodiment herein, the RRC connection reconfiguration message further comprises the measurement configuration for the UE 108 for at least one first serving frequency served by the MeNB 104 and at least one said second serving frequency served by the SeNB 106 wherein the measurement configuration includes at least one of a measurement event based on an A3 event, an A5 event, an Ax event, an indication for linking of measurement identities, a report on leave flag in the reportConfigEUTRA for the measurement event based on an A1 event, an A2 event and an A4 event and so on. The MeNB 104 can either trigger the DRB path switch procedure towards the core network (CN) for offloading the MCG bearer to the SeNB 106 or establishing new data radio bearers (DRBs) on the SeNB 106. At steps 308a and 308b for offloaded MCG bearer the MeNB 104 also sends the SN status count and performs data forwarding to the SeNB 106. At the UE side on comprehending the reconfiguration received in step 307, the UE 108 sends a RRC Connection Reconfiguration complete message to the MeNB 104 confirming the SCG establishment. At step 310, the UE 108 performs Random access procedure on the PSCell of SeNB 106 for uplink synchronization with the SeNB 106. After the random access procedure is successful, the UE 108 derives the security base key associated with SeNB 106 using at least one of SCC and cell-specific parameters of the PSCell. At step 311, the DRBs are established on the SCG SCells and secure data exchange between the SeNB 106 and UE 108 configured in dual connectivity mode of operation is handled by the SCG data bearer(s).

At step 312, the UE 108 evaluates measurement events for plurality of configured frequencies (i.e. including MCG and SCG cells), based on the measurement configuration received in step 307. The RRM measurement results can be sent on a trigger of a configured event being detected by the UE 108 (such as a modified measurement event, the Ax event and so on). The measurement report comprising the RRM measurement results associated with the PCell, PSCell, other S cells and so on can be sent in step 313 by the UE 108 to the MeNB 104 (i.e. to the PCell of the MeNB 104). The measurement results further comprises of at least one of RSRP and RSRQ. At step 314, on the MeNB 104 receiving the RRM measurement results associated with the MCG and SCG, the MeNB 104 makes a decision on whether the SeNB configuration for the UE 108 needs to be modified. The decision can be based on the measurement results for another configured frequency associated with the SeNB currently not serving the UE and/or neighbor cell measurements for cells served by another SeNB and/or a first serving frequency served by the MeNB 104. At step 315, the MeNB 104 initiates a procedure towards the SeNB 106 to modify the SeNB configuration for UE 108. In an embodiment herein, the MeNB 104 further provides the RRM measurement results concerning at least one second serving frequency served by the SeNB 106 for the UE 108 and/or concerning at least one configured frequency for the UE 108 apart from the set of second serving frequencies served by the SeNB 106 for the UE 108. Based on the RRM measurement results received in step 315, the SeNB 106 determines if the current PSCell for the UE 108 is to be changed taking the new information as one of the input parameter. However, the availability of the latest measurement results concerning the current PSCell is optional for the PSCell change decision-making process at the SeNB 106. In an embodiment herein, the SeNB determines if the current PSCell is to be changed based on the RRM measurement results concerning the second frequency associated with the current serving cell configured with the PUCCH resources and/or load information (i.e. physical resource availability) associated with the current serving cell configured with the PUCCH resources and so on. If the current PSCell for the UE 108 does not need to be changed, the SeNB 106 retains the current PSCell. If the current PSCell needs to be changed, the SeNB 106 determines a PSCell, based on a plurality of factors. The plurality of factors can comprise of the second serving frequency of current PSCell served by the SeNB 106 based on the received RRM measurement results not suitable from radio link quality point of view and/or received RRM measurement results for the set of second serving frequencies excluding the PSCell frequency but including measurement results for additional configured frequency to be better than measurement results for current PSCell and the load information (i.e. physical resource availability) assessed by the SeNB 106 for the current serving cell configured with the PUCCH resources and/or other SCG SCells. On performing the PSCell change, the SeNB 106 sends an indication about the PSCell change to the MeNB 104 at step 318. In an embodiment herein, the indication comprises of a cause value PSCell change in a X2 message over the X2 interface towards the MeNB 104. At step 319, the MeNB 104 further, verifies if there is a change in the current PSCell of the UE 108. If there is no change in the PSCell, the MeNB 104 does not perform any further related actions. If there is a change in the PSCell of the UE 108, in response, the MeNB 104 sends the updated SeNB key for the UE to the SeNB 106 at step 320. Towards the UE 108 the MeNB 104 sends a RRC Reconfiguration message at step 321, wherein the Reconfiguration message comprises of information related to at least the configuration of the new PSCell and the SCG counter (SCC) to enable the UE 108 to derive the update security base key associated with the SeNB 106.

In an embodiment herein, the UE 108 sends the RRM measurement results to the MeNB 104 for the one configured frequency and the another configured frequency when at least one of the measurement event associated with the measurement object being triggered and the indication for linking of measurement identities associated with a side condition is received in the reportConfigEUTRA by the UE 108.

In an embodiment herein, the pSCell/PSCell identification/selection determined by the SeNB 106 seems reasonable since the SeNB 106 can take the availability of e.g. PUCCH resources into account i.e. load information or physical resource availability. In another embodiment, if the SeNB identified/selected pSCell/PSCell has to meet an additional radio link quality criterion, then the MeNB 104 needs to be involved since the MeNB handles the RRM measurements of the UE. The MeNB 104 can assist the SeNB 106 with measurement information by providing the SeNB 106 with a list of SCG cells meeting the pSCell/PSCell measurement criterion and/or forward the RRM measurement results for the set of SCells from which the SeNB can make a selection of pSCell/PSCell based on PUCCH resource availability i.e. load information).

In an embodiment herein, the assistance procedures by which one eNB provides a list of candidate pCells/PSCells and/or RRM measurement results for SCG SCells, as discussed above, the information exchange is considered being a slow scale interaction procedure i.e. the assistance information would be provided only if there is a real need.

For the assistance information exchange between MeNB and SeNB for pSCell/PSCell identification and selection, the general principle applied in this invention is that if SeNB 106 is deciding the pSCell/PSCell then MeNB 104 provides the RRM measurements of the UE for a list of SCells and the SeNB 106 decides the pSCell/PSCell based on RRM measurement results and/or physical resource availability i.e. load information/PUCCH resource availability.

Figure 4:
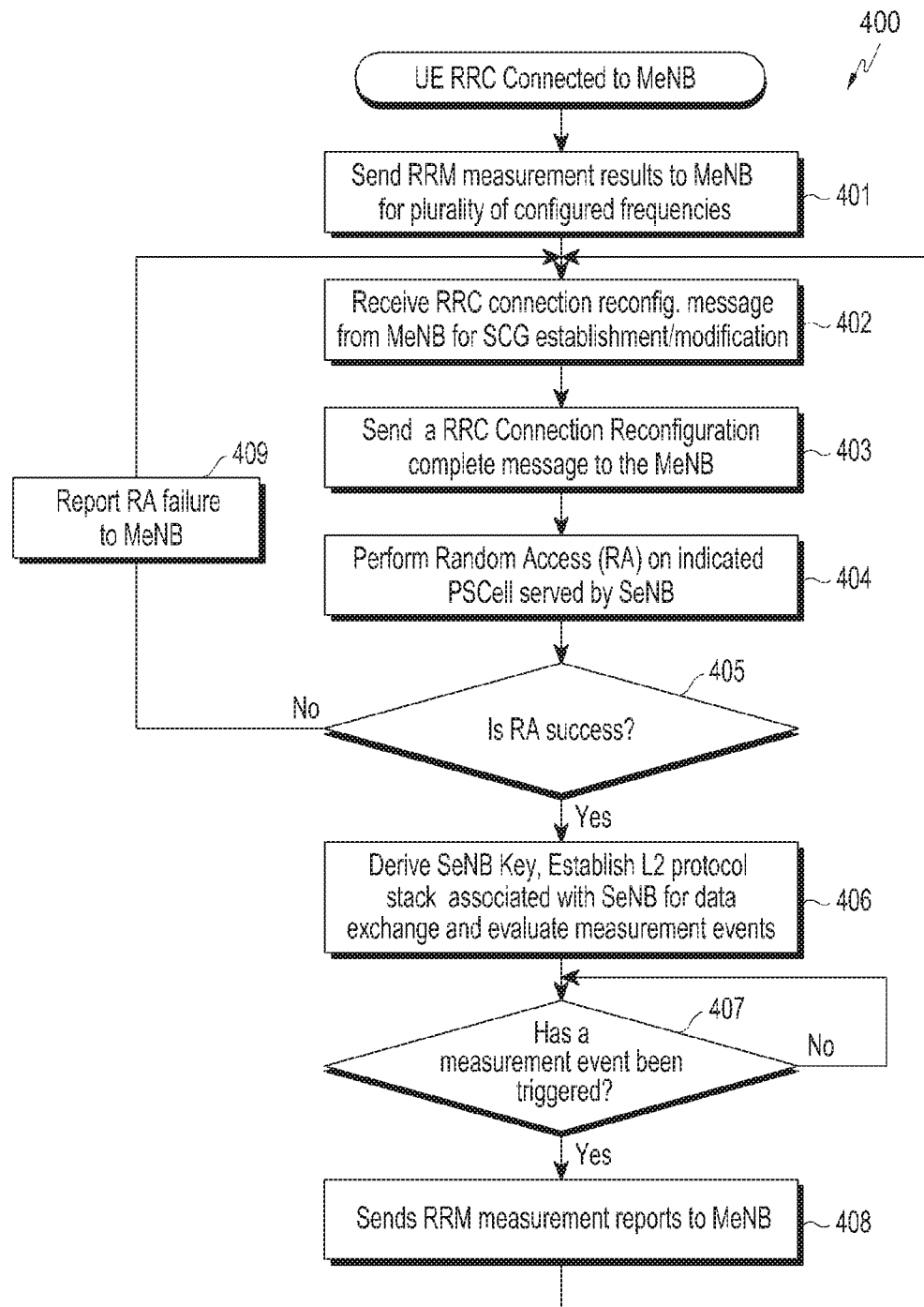
FIG. 4 is a flowchart illustrating the UE operation for performing measurement event evaluation for a serving cell configured with Physical Uplink Control Channel (PUCCH) resources including plurality of MCG and SCG SCells when said UE is operating in a dual connectivity mode of operation, according to embodiments as disclosed herein.

FIG. 4 is a flowchart illustrating the UE operations for performing measurement event evaluation for a serving cell configured with Physical Uplink Control Channel (PUCCH) resources including plurality of MCG and SCG SCells when said UE is operating in a dual connectivity mode of operation, according to embodiments as disclosed herein. On establishing RRC connection on the PCell of the MeNB 104, the UE 108 performs RRM measurements for plurality of configured frequencies based on the received measurement configuration. The UE 108 sends (401) the RRM measurement report to the PCell of the MeNB 104 when at least one of the measurement event associated with plurality of configured frequencies gets triggered. On a new SeNB 106 being added, the UE 108 receives (402) a RRC Connection Reconfiguration message for a SCG establishment from the MeNB 104. The Reconfiguration message comprises of information related to at least the PSCell configuration i.e. the serving cell configured with PUCCH resources for the UE, one or more SCG SCells added, SCG counter (SCC), measurement configurations and so on. Based on the reconfiguration message, the UE can comprehend with the new configuration related to SCG establishment. On comprehending the reconfiguration, the UE 108 sends (403) a RRC Connection Reconfiguration complete message to the MeNB 104 indicating that the UE 108 has applied the configuration associated with the SeNB 106. The UE 108 then performs (404) the Random Access (RA) procedure on the cell configured with PUCCH resources for the UE 108 to get uplink synchronized on at least the PSCell served one of the frequencies belonging to the second set of frequencies associated with the SeNB 106. The UE 108 check (405) if the Random Access (RA) procedure on the PSCell served by the SeNB 106 is successful. If the RA procedure is successful, then the UE 108 derives (406) the security base key associated with SeNB 106 based on at least one of SCC and cell-specific parameters of the PSCell. The UE 108 further establishes the L2 user plane protocol stack i.e. SCG MAC entity and RLC and PDCP entity for the data radio bearers associated with the SeNB 106. Using the security base key associated with the SeNB 106, data exchange is now possible for the SCG DRBs between the UE 108 and SeNB 106. Also, data exchange continues for the MCG DRBs between the UE 108 and MeNB 104 applying the security base key associated with the MeNB 104. Since the UE 108 is mobile, the UE 108 continuously evaluates (407) the measurement events, according to the measurement configuration as received in the RRC reconfiguration message. The measurement configuration includes one or more measurement objects, one or more measurement identities and one or more reporting configurations. Each measurement object can be associated with the corresponding frequency served by the MeNB 104 or the SeNB 106. The reporting configuration comprises the measurement events such as the A3, A5 events and so on. The measurement identity links the measurement object and the reporting configuration. In an embodiment herein, if the event A3 and/or event A5 is configured in the reporting configuration then either the measurement object or the reporting configuration is extended with a flag indicating whether the event is applicable to the PCell of the MeNB 104 or the PSCell of the SeNB 106. Alternately the measurement configuration comprising more than on measurement identities can be linked with a flag in the reporting configuration, as depicted in FIGS. 11b and 11c. On detecting (407) the triggering of the measurement event, the UE 108 sends (408) measurement results to the PCell of the MeNB 104 associated with serving cells and neighbor cells served by plurality of configured frequencies for the UE. The measurement results comprise of RRM measurement results for PCell of the UE 108 associated with MeNB 104, the PSCell of the UE 108 associated with SeNB 106, other MCG and SCG SCells and so on. The measurement results further comprises of at least one of Reference Signal Received Power (RSRP) and Received Signal Received Quality (RSRQ). After sending the RRM measurement results the UE 108 can expect a further RRC reconfiguration message from the MeNB 104. At step 405, if it detected that the random access procedure has failed then the UE 108 reports (409) the same to the PCell associated with the MeNB 104. The various actions in method 400 can be performed in the order presented, in a different order or simultaneously. Further, in some embodiments, some actions listed in FIG. 4 can be omitted.

Figure 5A:
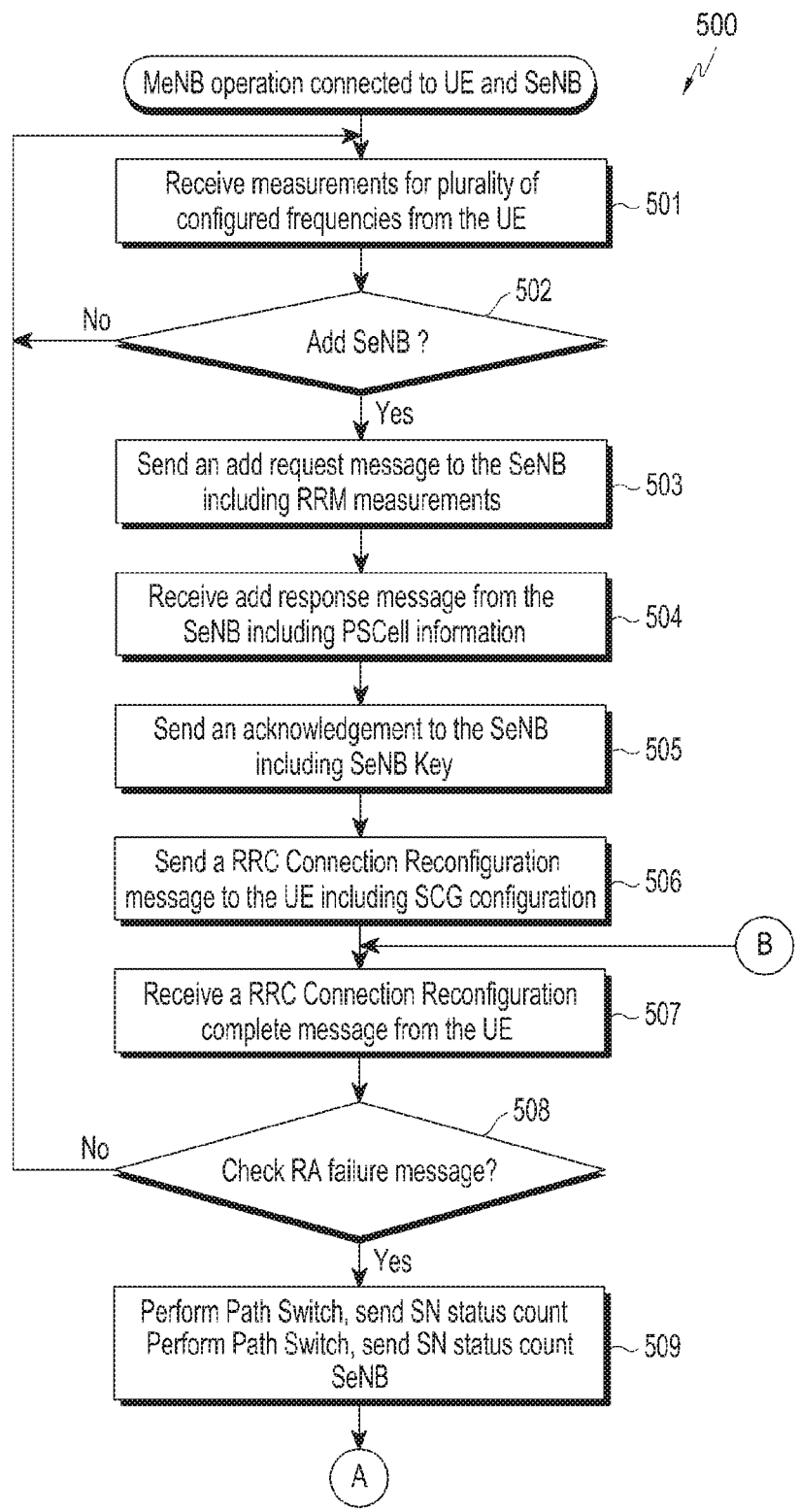
FIGS. 5a and 5b are flowcharts illustrating the MeNB operation for configuring the UE to operate in a dual connectivity mode of operation, according to embodiments as disclosed herein.
Figure 5B:
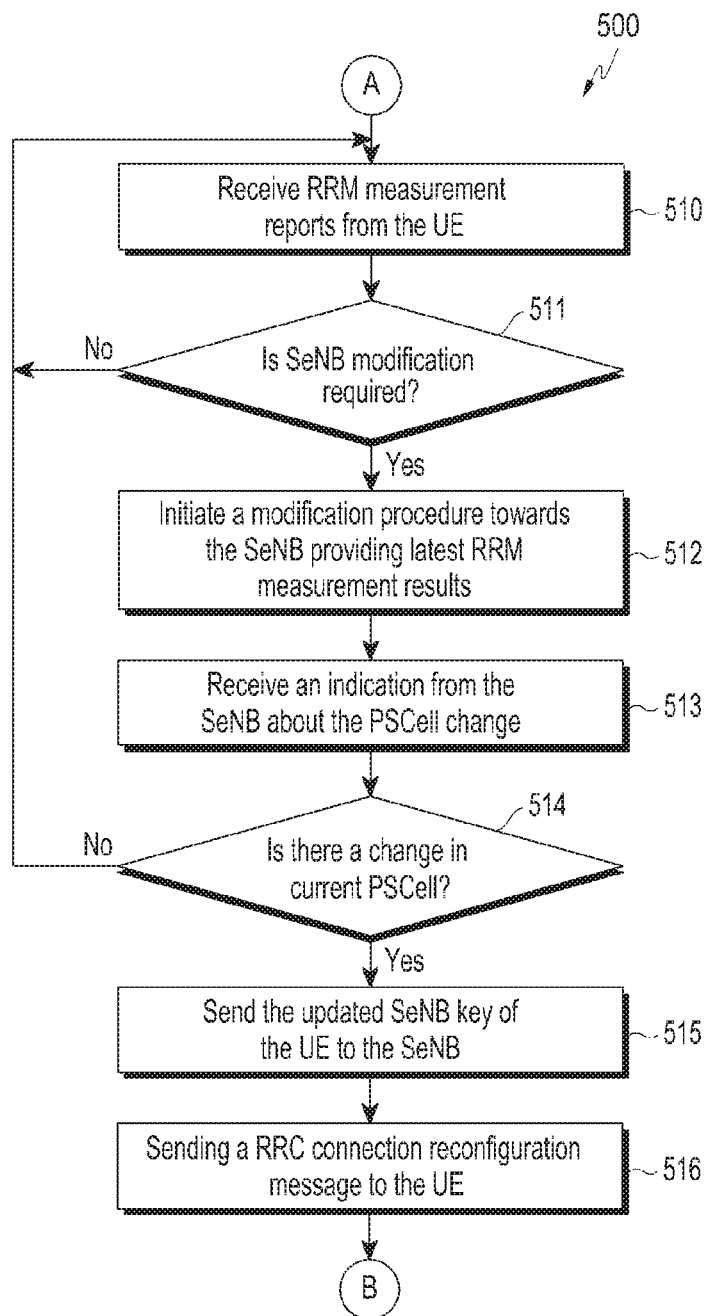

FIGS. 5a and 5b are flowcharts illustrating the MeNB operation for configuring the UE to operate in a dual connectivity mode of operation, according to embodiments as disclosed herein. The UE 108 is connected to the PCell associated with the MeNB 104 after establishing the RRC connection. The MeNB 104 can be connected to one or multiple SeNBs through X2 interface.

The MeNB 104 receives (501) the measurement reports/results for plurality of configured frequencies from the UE 108, on the criteria for configured measurement event being satisfied or triggered at the UE side. Based on the received measurement results and if the data demand for the UE 108 is high, the MeNB 104 checks (502) if a suitable SeNB from a plurality of SeNBs connected through X2 interface to the MeNB 104 can be added. Once the MeNB 104 decides to add the SeNB 106, the MeNB 104 sends (503) an add request comprising of a plurality of SCells to the SeNB 106 over the X2 interface along with the associated RRM measurements sent by the UE 108. In response the MeNB 104 receives an add response message (504) from the SeNB 106, wherein the add response comprises of information related to the PSCell and other SCells associated with the SeNB 106. The response message comprises the SCG configuration, which includes at least the PSCell configuration i.e. the serving cell, configured with PUCCH resources for the UE, and optionally plurality of SCells associated with SeNB 106. On receiving (504) the add response from the SeNB 106, the MeNB 104 approves the received SCG configuration sent by the SeNB 106. The MeNB 104 derives the security base key of the UE 108 associated with the SeNB 106 based at least one of SCG counter and cell-specific parameters of the PSCell. The MeNB 104 sends (505) an acknowledgement to the SeNB 106, which comprises the security based key for the UE 108 associated with SeNB 106. The MeNB 104 sends (506) a RRC Connection Reconfiguration message to the UE 108, wherein the Reconfiguration message comprises of information related to at least the PSCell configuration i.e. the serving cell configured with PUCCH resources for the UE, one or more SCG SCells added, SCG counter (SCC), measurement configurations and so on. The MeNB 104 receives (507) a RRC Connection Reconfiguration complete message from the UE 108 on the UE 108 comprehending the reconfiguration sent in (506) indicating to the MeNB 104 that it has applied the configuration associated with the SeNB 106. The MeNB 104 checks (508) if the UE has sent a Random Access (RA) report to the PCell associated with the MeNB 104 indicating that the UE failed to uplink synchronize on the PSCell associated with the SeNB 106. If the MeNB 104 does not receive the RA failure report from the UE 108 then it is assumed that RA procedure on the PSCell associated with the SeNB 106 is successful. The MeNB 104 sends the SN status count and performs (509) data forwarding to the SeNB 106 and starts the path switch procedure towards the core network (CN) to offload the MCG bearer to the SeNB 106. With this procedure the offloaded bearers are established on the SeNB 106 and the UE 108 starts operating in dual connectivity mode of operation with the MeNB 104 and SeNB 106. Further, the MeNB 104 receives (510) measurement results from the UE 108 as the UE 108 continuously evaluates the measurement events, according to the measurement configuration received in the RRC reconfiguration message (as in 506). The measurement results comprise of RRM measurement results for PCell associated with MeNB 104, PSCell associated with SeNB 106, other MCG and SCG SCells and so on. The measurement results further comprises of at least one of Reference Signal Received Power (RSRP) and Received Signal Received Quality (RSRQ). On the MeNB 104 receiving the measurement results, the MeNB 104 checks (511) whether the SeNB configuration for the UE 108 needs to be changed. In an example, the decision can be based the measurement results for a configured frequency currently not served by the SeNB 106 to the UE 108 is better than a threshold and can be added as an SCG SCell to the UE 108. On deciding (511) to change the SeNB configuration for the UE 108, the MeNB 104 initiates (512) a procedure to the SeNB 106 to modify the SeNB 106 over the X2 interface by sending a modification message. In an embodiment herein, the modification message can include either the RRM measurements sent by the UE 108 associated with plurality of SCG SCells and/or new SCG SCell decided to be added by the MeNB 104. Alternately the MeNB 104 can provide to the SeNB 106 with a list of SCG cells in the modification message meeting the PSCell measurement criterion. On receiving (512) an indication from the SeNB 106 about the PSCell change, the MeNB 104 checks (514) whether the configuration for PSCell provided by SeNB 106 is different from the current configured PSCell for the UE 108. In case PSCell for the UE 108 has changed or modified then the MeNB 104 sends (515) the updated SeNB key of the UE to the SeNB 106. Also MeNB 104 sends (516) a RRC Reconfiguration message to the UE 108, wherein the Reconfiguration message comprises of information related to the configuration of the new or modified PSCell i.e. the serving cell configured with PUCCH resources for the UE, one or more SCG SCells added, SCG counter (SCC), measurement configurations and so on. The process control then moves back to step 507 where the MeNB 104 receives RRC reconfiguration complete message from the UE 108. The various actions in method 500 can be performed in the order presented, in a different order or simultaneously. Further, in some embodiments, some actions listed in FIGS. 5*a* and 5*b* can be omitted.

Figure 6A:
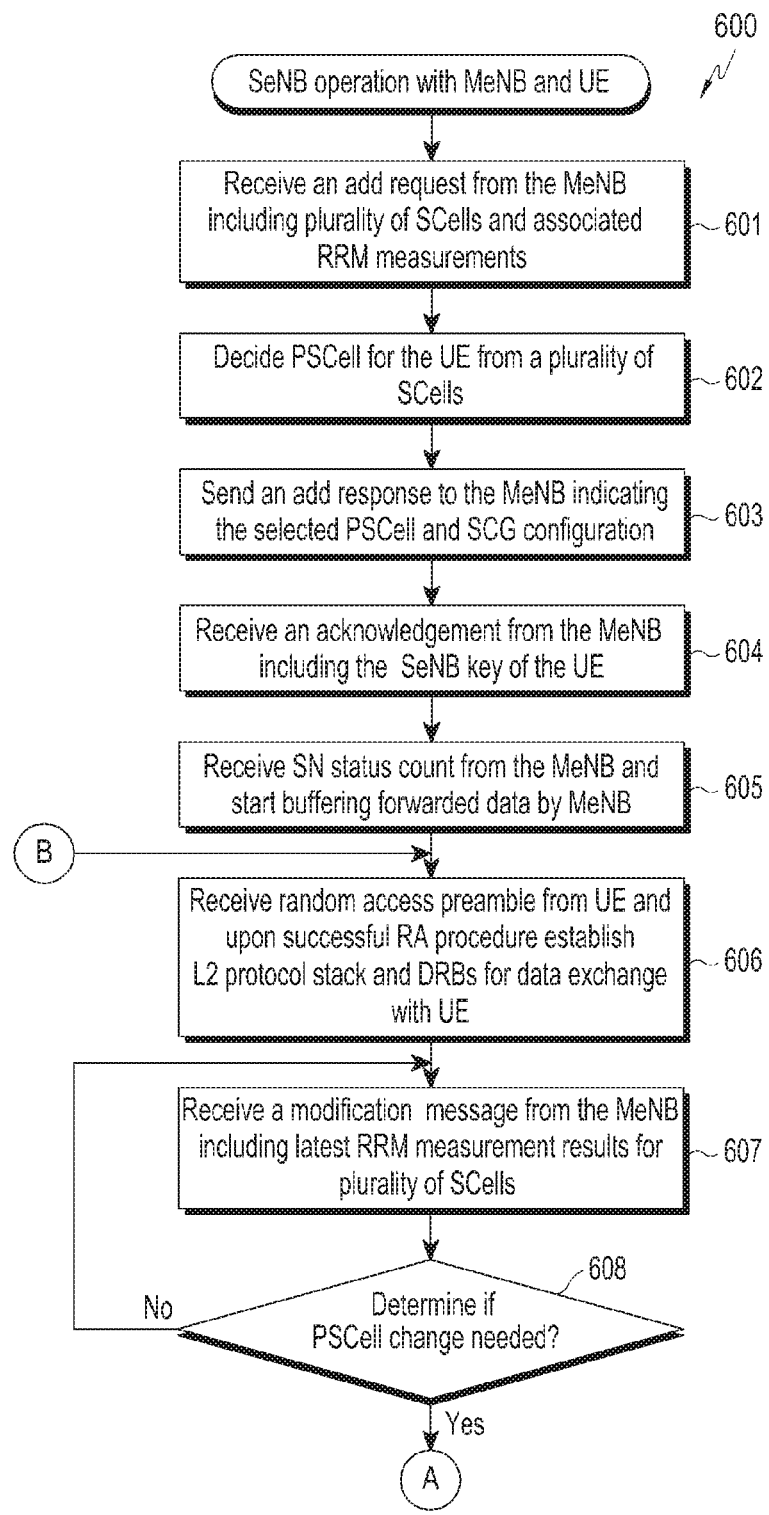
FIGS. 6a and 6b are flowcharts illustrating the SeNB operation for performing selection of a serving cell for a UE to be configured with Physical Uplink Control Channel (PUCCH) resources from a plurality of SCG SCells when said UE is configured to operate in a dual connectivity mode of operation, according to embodiments as disclosed herein.
Figure 6B:
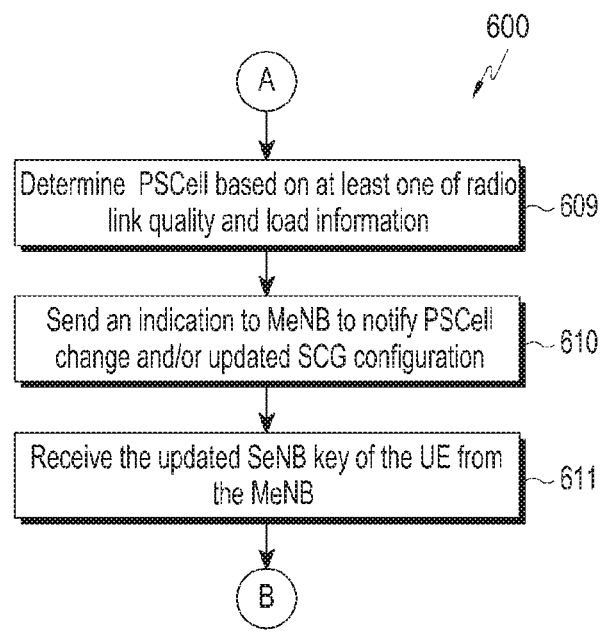

FIGS. 6*a* and 6*b* is a flowchart illustrating the SeNB operation for performing selection of a serving cell for a UE to be configured with Physical Uplink Control Channel (PUCCH) resources from a plurality of SCG SCells when said UE operates in a dual connectivity mode of operation, according to embodiments as disclosed herein. The UE 108 is connected to the PCell associated with the MeNB 104 after establishing the RRC connection. The MeNB 104 can be connected to one or multiple SeNBs through the X2 interface. Based on the received measurement results from the UE and if the data demand for the UE 108 is high, the MeNB 104 decides to add the SeNB 106. The SeNB 106 receives (601) an add request from the MeNB 104 over the X2 interface, wherein the add request comprising of a plurality of SCells to the SeNB along with the associated RRM measurements sent by the UE 108. Based on the received add request, the SeNB 106 decides (602) a PSCell, wherein the PSCell can be selected from the SCells received from the MeNB 104 based on the RRM measurements associated with the SCells and load information. On deciding the PSCell, the SeNB 106 sends (603) an add response to the MeNB 104, wherein the add response indicates the PSCell and the SCG configuration which includes at least the PSCell configuration i.e. the serving cell, configured with PUCCH resources for the UE, and optionally a plurality of SCells associated with SeNB 106. The MeNB 104 approves the received SCG configuration sent by the SeNB 106, and sends the response to SeNB. The SeNB 106 receives (604) an acknowledgement from the MeNB 104, wherein the acknowledgement comprises the security-based key for the UE 108 associated with SeNB 106. The MeNB 104 derives the security base key of the UE 108 associated with the SeNB 106 based on at least one of SCG counter and cell-specific parameters of the PSCell. The SeNB 106 receives (605) the SN status count from the MeNB 104 and starts buffering forwarded data sent by MeNB 104. The MeNB 104 sends the SCG configuration to the UE 108 and starts the path switch procedure towards the core network (CN) to offload the MCG bearer to the SeNB 106. The UE 108 then performs the Random Access (RA) procedure on the cell configured with PUCCH resources for the UE 108 to get uplink synchronized on at least the PSCell served on one of the frequencies belonging to the second set of frequencies associated with the SeNB 106. The SeNB 106 receives (606) the random access preamble from the UE 108 and upon successful random access (RA) procedure; the SeNB 106 establishes the L2 protocol stack and DRBs for data exchange with the UE 108. With this procedure, the offloaded bearers are established on the SeNB 106 and the UE 108 starts operating in dual connectivity mode of operation with the MeNB 104 and SeNB 106. The MeNB 104 can receive measurement results from the UE 108 as the UE 108 continuously evaluates the measurement events, according to the measurement configuration received in the RRC reconfiguration message. The measurement results comprise of RRM measurement results for PCell associated with MeNB 104, PSCell associated with SeNB 106, other MCG and SCG SCells and so on. On basis of these measurement results, the MeNB 104 can further decide to change or modify the SeNB configuration for the UE 108. The SeNB 106 can further receive (607) a modification message from the MeNB 104, wherein the modification message can include either the RRM measurements sent by the UE 108 associated with plurality of SCG SCells and/or new SCG SCell decided to be added by the MeNB 104. Alternately the MeNB 104 can provide to the SeNB 106 with a list of SCG cells in the modification message meeting the PSCell measurement criterion. The SeNB 106 determines (608) if a change in the PSCell is required based on modification message received from MeNB 104. The process control then moves back to step 607 If SeNB 106 determines a change in the PSCell is not required. If a change in the PSCell is required, the SeNB 106 determines (609) the PSCell, wherein the PSCell can be determined based on at least one of radio link quality and load information. The radio link quality can be determined based on RRM measurements sent by the UE 108 associated with plurality of SCG SCells and/or new SCG SCell decided to be added by the MeNB 104 On determining the PSCell, the SeNB 106 sends (609) an indication to the MeNB 104, wherein the indication comprises of the change in the PSCell and/or updated SCG configuration. The MeNB 104 generates an updated SeNB key, based on the new PSCell and/or updated SCG configuration. The SeNB 106 receives (611) the updated SeNB key of the UE 108 from the MeNB 104. The various actions in method 600 can be performed in the order presented, in a different order or simultaneously. Further, in some embodiments, some actions listed in FIGS. 6a and 6b can be omitted.

Figure 7:
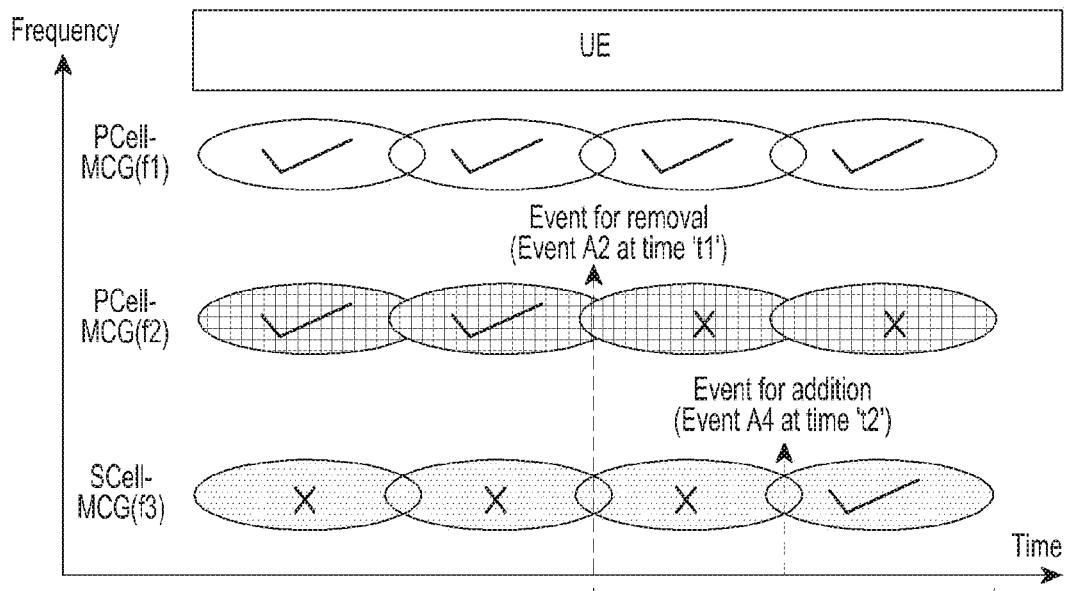
FIG. 7 depicts the reason as to why Event A3 and Event A5 are required to be modified.

FIG. 7 illustrates the usage of the Events A2 and A4. These events (A2 and A4) can be used only for addition/removal of the carrier, as shown in FIG. 7. A change of a serving cell is generally performed in order to avail the service from a better cell, which has better radio characteristics, resulting in the UE 108 utilizing a lower uplink transmission power, or to a cell which has more resources for scheduling so that the data rate for the UE can be improved. Currently, a change of a serving cell is governed using relative comparison of the currently serving cell and the measured neighbor cell.

Specifications have provisioned measurement events A3 and A5 for intra-frequency and inter-frequency measurement evaluation of a Pcell with its neighbor cell. This is an indicating factor to the eNB/network for the existence of a better cell (stronger signal conditions) than the currently serving Pcell. The standards also provision a measurement event A6 for evaluating best intra-frequency neighbors for Scell. By using A3 and A5, it can be ensured that the Pcell is the best cell available in that location and by using A6, it can be ensured that the Scell is the best available component carrier on the provided frequency.

However, these events do not suffice the requirement to determine pScell/PSCell change to a better cell. Events A3 and A5 are presently defined only for change of Pcell and hence cannot be utilized for change of pScell/PSCell. Event A6 cannot be extended for pScell change as pScell and Scell can be of different carrier frequencies and A6 caters only to intra-frequency evaluations. If event A6 is extended to inter-frequency measurements, then it loses its purpose of finding the best Scell on the configured component carrier.

Events A3 and A5 can be extended appropriately to meet the need for governing the change of the pScell. These events can be extended to dual usage (i.e., for neighbor comparison for both Pcell and pScell). A new definition needs to be defined for Event A3 and event A5. Following extension is needed:

Event A3: A neighbor becomes offset better than PCell of UE associated with MeNB or Special cell (PSCell) of UE associated with SeNB.

Event A5: PCell of UE associated with MeNB 104 or Special Cell (PSCell) of UE associated with SeNB 106 becomes worse than threshold1 and neighbour becomes better than threshold2.

The above extension meets the following requirements:
Dual usage of Event A3/A5 i.e. for both PCell and pSCell.
Independent configuration of A3/A5 for PCell and pSCell
Independent triggering of A3/A5 for PCell and pSCell
Independent reporting of measurement results for Pcell and pSCell.

The UE 108 is aware which cell is its PCell (i.e. the cell on which it establishes the RRC connection). The UE 108 is aware which cell is its pSCell (i.e. cell in SCG on which PUCCH resources are configured).

Independent configuration can be signaled in two ways (as depicted below).

Two possibilities to extend applicability of events A3/A5 to PCell or pSCell is provided: a modification to ReportConfigEUTRA or a modification to MeasObjectEUTRA.

Option 1: Modification to ReportConfigEUTRA

Figure 8A:
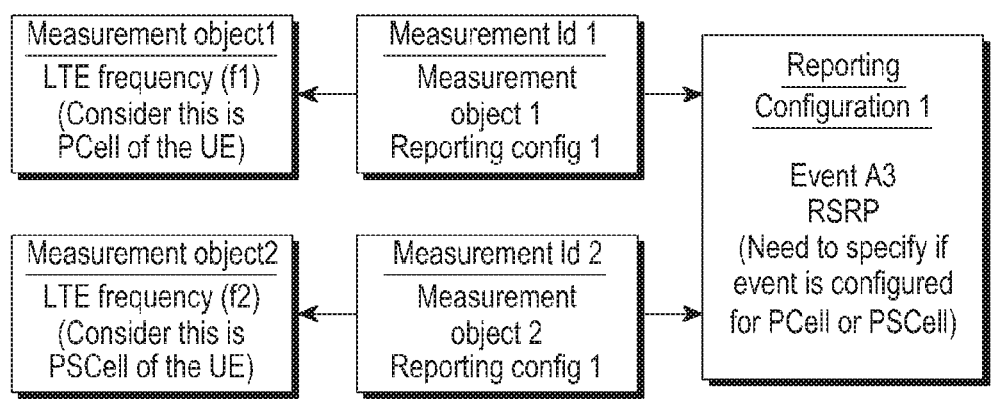
FIGS. 8a and 8b illustrates a method to extend the applicability of events A3 and A5 to PCell or PSCell using a modified reporting configuration (having a new information element or a flag indication the cell group i.e. whether the event is evaluated for PCell or PSCell), according to the embodiments as disclosed herein.
Figure 8B:
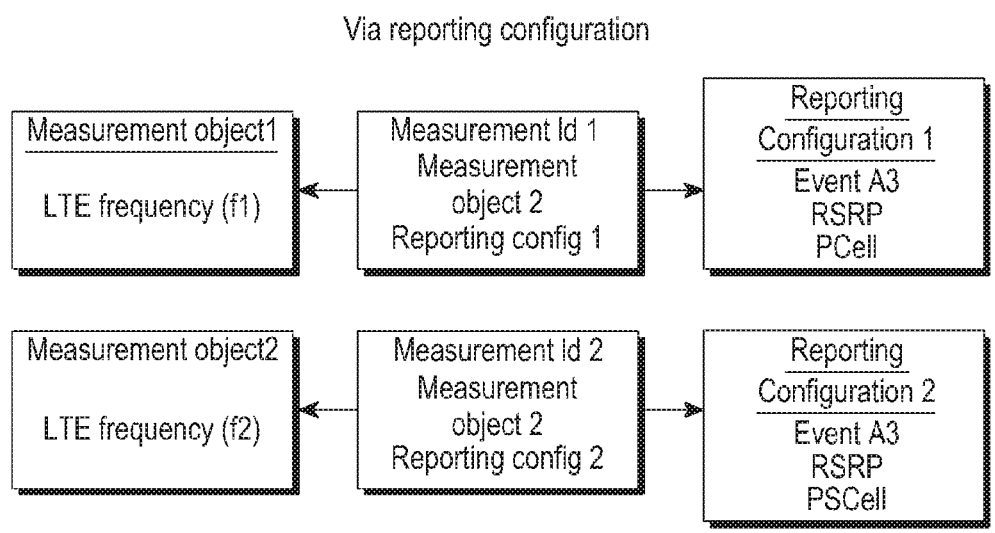

The network can choose to provide independent configuration for A3 and A5 evaluation for Pcell and pScell using an additional field in the measurement configuration by modifying the field ReportConfigEUTRA as shown in FIG. 8b. Modification to ReportConfigEUTRA includes the addition of a new Information element (IE) termed as cellGroup. This new IE can be configured with two distinct values (Pcell, pScell) indicating the UE about the cell group or eNodeB toward which the measurement is configured. For example, a reportConfigEUTRA configured for cellGroup Pcell (for event A3) will indicate the UE that the corresponding measurement object (measurement id is linked to a measurement object and a reporting configuration) has to be evaluated for the change of Pcell (Neighbor becomes amount of offset better than PCell) and not for change of pScell (Neighbour becomes amount of offset better than pSCell).

Had the network not configured this IE, then the UE would evaluate the measurement object in comparison to both Pcell measurements as well as pScell measurements independently and send the measurement reports for each of them when the reporting criterion is met.

Depicted below is an example wherein the ReportConfigEUTRA is modified, by addition of new fields as highlighted (in italics).

```
ReportConfigEUTRA information element
ASN1START
ReportConfigEUTRA ::= SEQUENCE {
triggerType CHOICE {
event SEQUENCE {
eventId CHOICE {
eventA1 SEQUENCE {
a1-Threshold ThresholdEUTRA
},
.....},
eventA3 SEQUENCE {
a3-Offset INTEGER (-30..30),
reportOnLeave BOOLEAN
cellGroup enum {Pcell, pSCell}
},
.....},
```

```
        eventA5 SEQUENCE {
        a5-Threshold1 ThresholdEUTRA,
        a5-Threshold2 ThresholdEUTRA
        cellGroup enum {Pcell,pSCell}
        },
        ..... ...,
        threshold-RSRQ RSRQ-Range
        }
        ASN1STOP
```

In an embodiment herein, the A3 and the A5 events are modified to be applicable for a serving cell configured with the PUCCH resources for the UE 108 on at most one second serving frequency served by the SeNB 106 through report-ConfigEUTRA.

Option 2: Modification to MeasObjectEUTRA

Figure 9A:
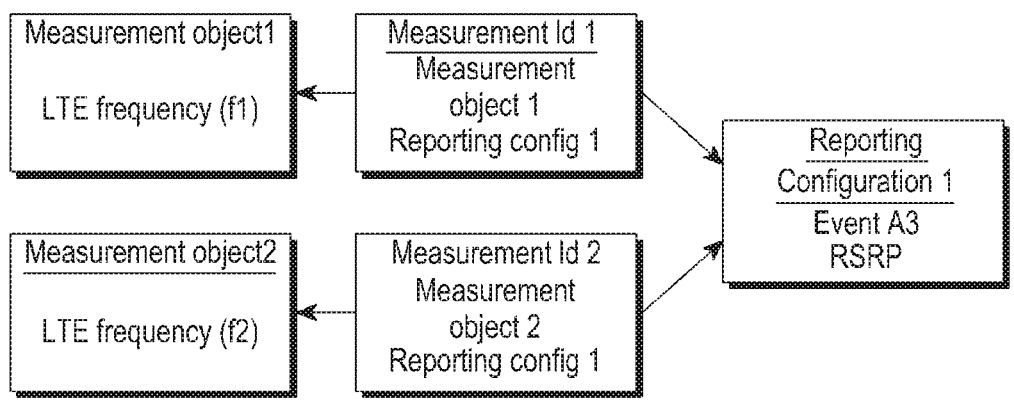
FIGS. 9a and 9b illustrate alternate methods to extend applicability of events A3 and A5 to PCell and PSCell, according to embodiments as disclosed herein.
Figure 9B:
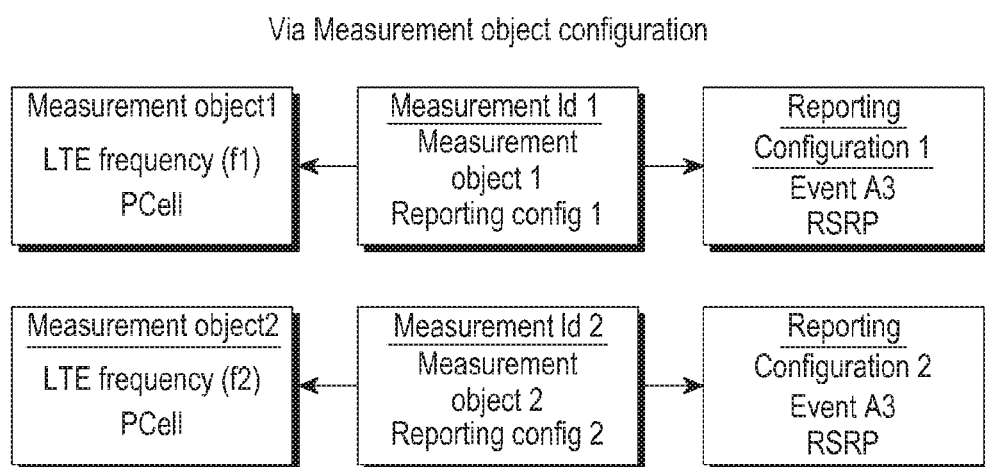
Figure 10A:
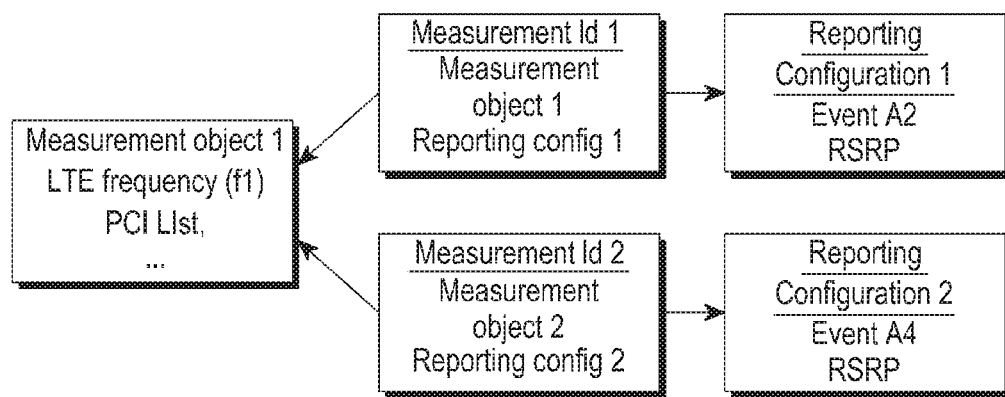
FIGS. 10a and 10b illustrate methods for independent triggering of measurement events based on absolute thresholds and an example scenario when TTT is running for configured measurement events associated with corresponding measurement Ids.
Figure 10B:
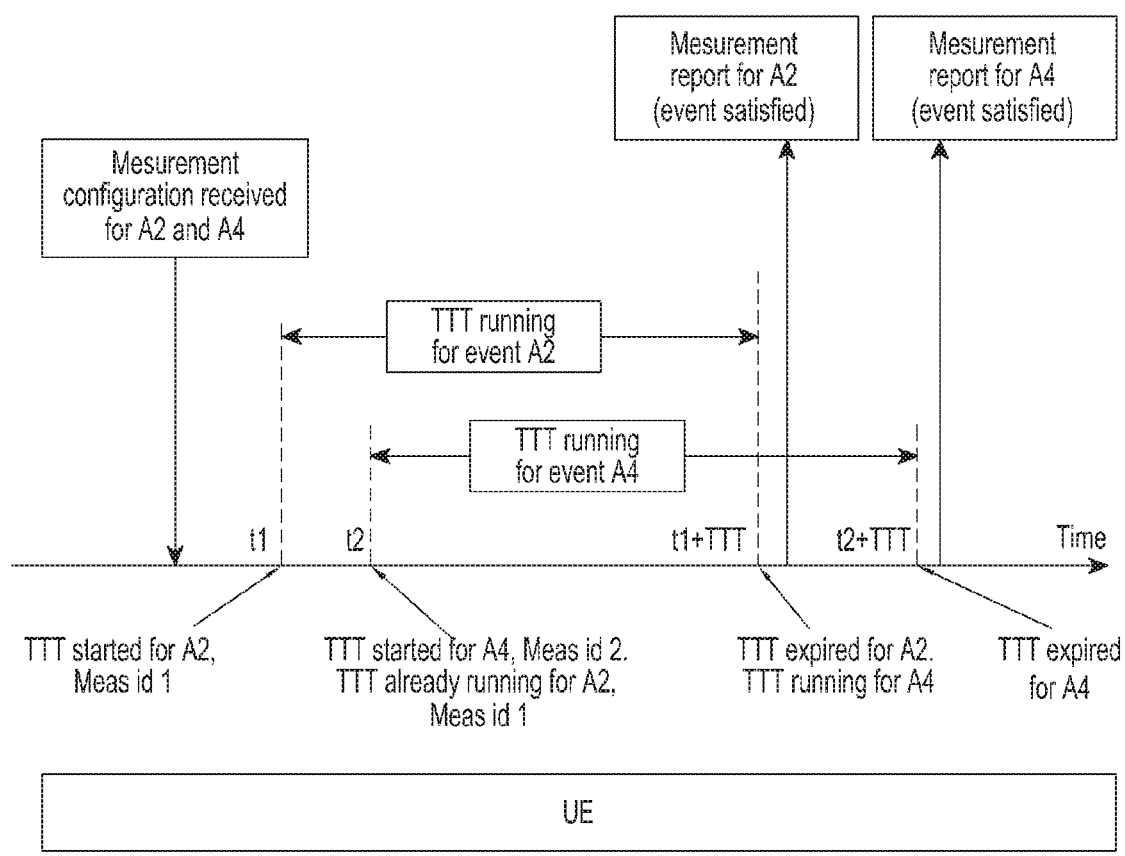

Network can choose to provide independent configuration for A3 and A5 evaluation for Pcell and pScell using an additional field in the measurement configuration by modifying the MeasObjectEUTRA in the RRC reconfiguration message as shown in FIG. 9b. Modification to MeasObjectEUTRA includes the addition of a new IE termed as cellGroup. This new IE can be configured with two distinct values (Pcell, pScell) indicating the UE 108 about the cell group or eNodeB toward which the measurement is configured. For example, a MeasObjectEUTRA configured for cellGroup Pcell (for event A3) will indicate the UE 108 that the corresponding measurement object (measurement id is linked to a measurement object and a reporting configuration) has to be evaluated for the change of Pcell (Neighbour becomes amount of offset better than PCell) and not for change of pScell (Neighbour becomes amount of offset better than pScell).

Had the MeNB 104 not configured this IE, then the UE would evaluate the measurement object in comparison to both Pcell measurements as well as pScell measurements independently and used the measurement reports for each of them when the reporting criterion is met.

Example for Modification to MeasObjectEUTRA by addition of new fields as highlighted (in italics).

```
MeasObjectToAddModList information element
--ASN1START
MeasObjectToAddModList::=
SEQUENCE(SIZ(1..maxObjectId))OF MeasObjectToAddMod
MeasObjectToAddModList-v9e0::=
SEQUENCE (SIZE (1..maxObjectId)) OF MeasObjectToAddMod-v9e0
MeasObjectToAddMod ::=SEQUENCE {
measObjectId MeasObjectId,
cellGroupenum {Pcell, pSCell},
measObject CHOICE {
measObjectEUTRA MeasObjectEUTRA,
measObjectUTRA MeasObjectUTRA,
measObjectGERAN MeasObjectGERAN,
measObjectCDMA2000
MeasObjectCDMA2000,
...
}
}
MeasObjectToAddMod-v9e0 :: =SEQUENCE {
measObjectEUTRA-v9e0 MeasObjectEUTRA-v9e0
OPTIONAL-- Cond eutra
}
--ASN1STOP
```

In an embodiment herein, the A3 event and the A5 event are modified to be applicable for a serving cell configured with the PUCCH resources for the UE 108 on at most one second serving frequency served by the SeNB 106 through measObject.

In an embodiment herein, where pScell change is governed by introducing a new event Ax, a new event is required for governing the change of pScell where a relative comparison can be performed between the serving pScell and a neighbour cell belonging to a different frequency but the same eNodeB. The evaluation is performed as per the below expression ensuring that the neighbor cell is an offset better than the pScell. The entering and leaving condition for this event is defined below:

Event $Ax => (Ncell-hysteresis) > (pScell+offset)$    Entering condition:

Event $Ax => (Ncell+hysteresis) < (pScell+offset)$    Leaving condition:

Ncell and pScell represent the measurement values for neighbor cell and pScell and offset represents the measurement offset configured by the network.

The Ax event is an event defined for a serving cell configured with the PUCCH resources for the UE 108 on at most one second serving frequency served by the SeNB 106.

In an embodiment herein, wherein a new field in the measurement report message is introduced, the network should be able to distinguish measurement results for PCell and pSCell, which requires the following changes:

Modification to MeasResults

Need to add new IE as highlighted below

Modification to MeasResults includes the addition of a new IE termed as measResultpSCell. This new IE can be configured with two distinct variables (rsrpResult, rsrqResult) indicating the eNodeB about the measurement values of the serving pScell once it has satisfied the configured reporting criteria. The current standard specification (3GPP TS 36.331) does not have the provision to report the measurements for pScell and a new IE has to be provisioned.

```
        MeasResults information element
        --ASN1START
        MeasResults ::=SEQUENCE {
        measId MeasId,
        measResultpSCell SEQUENCE {
        rsrpResult RSRP-Range,
        rsrqResult RSRQ-Range
        },
        csg-Identity-r9 CSG-Identity OPTIONAL
        }
        --ASN1ST0P
```

Figure 11A:
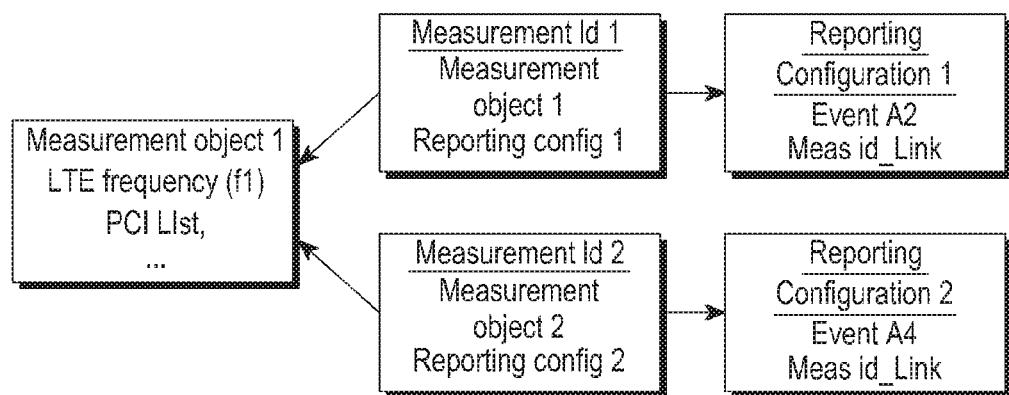
FIGS. 11a, 11b and 11c illustrate methods for linking of measurement events based on absolute thresholds and example scenarios when the TTT is expired for only one configured measurement event but reporting is done for linked measurement events associated with corresponding measurement IDs, according to embodiments as disclosed herein.
Figure 11B:
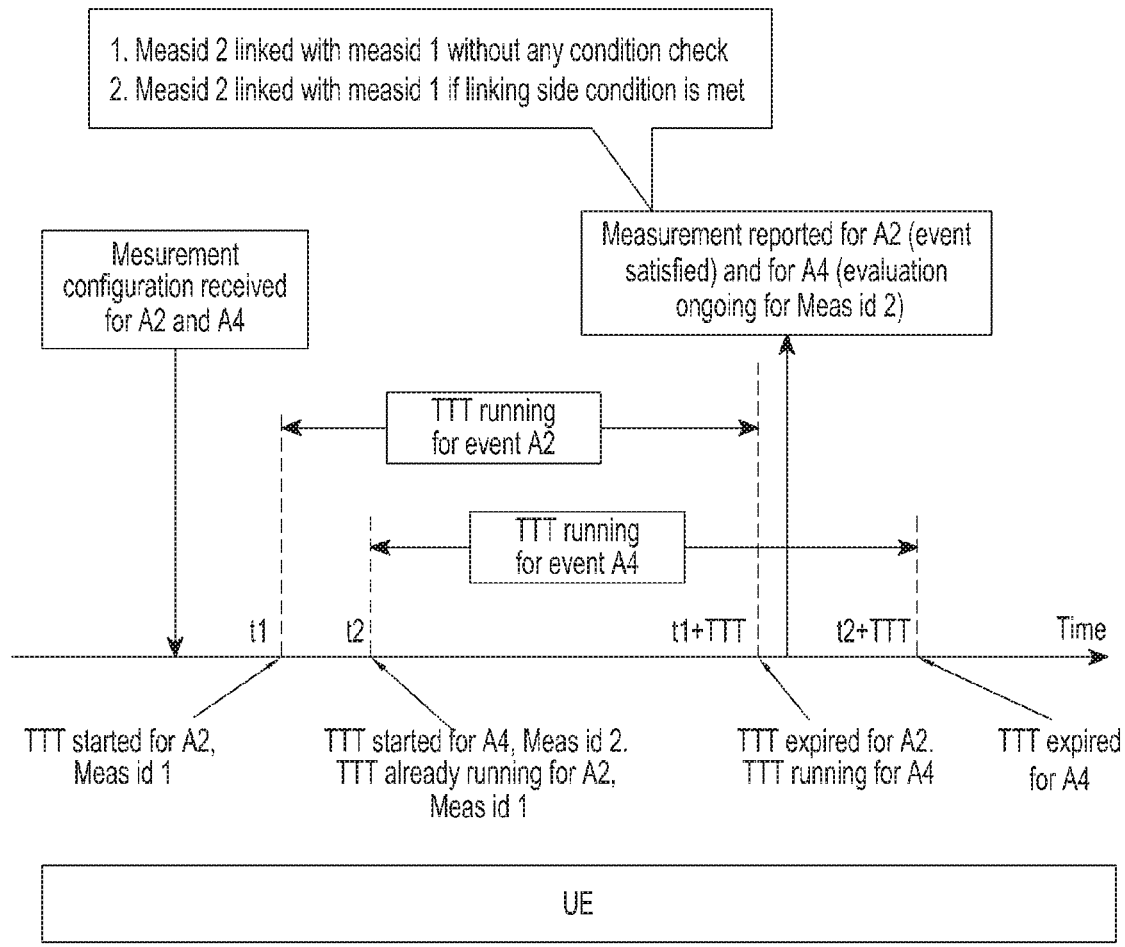
Figure 11C:
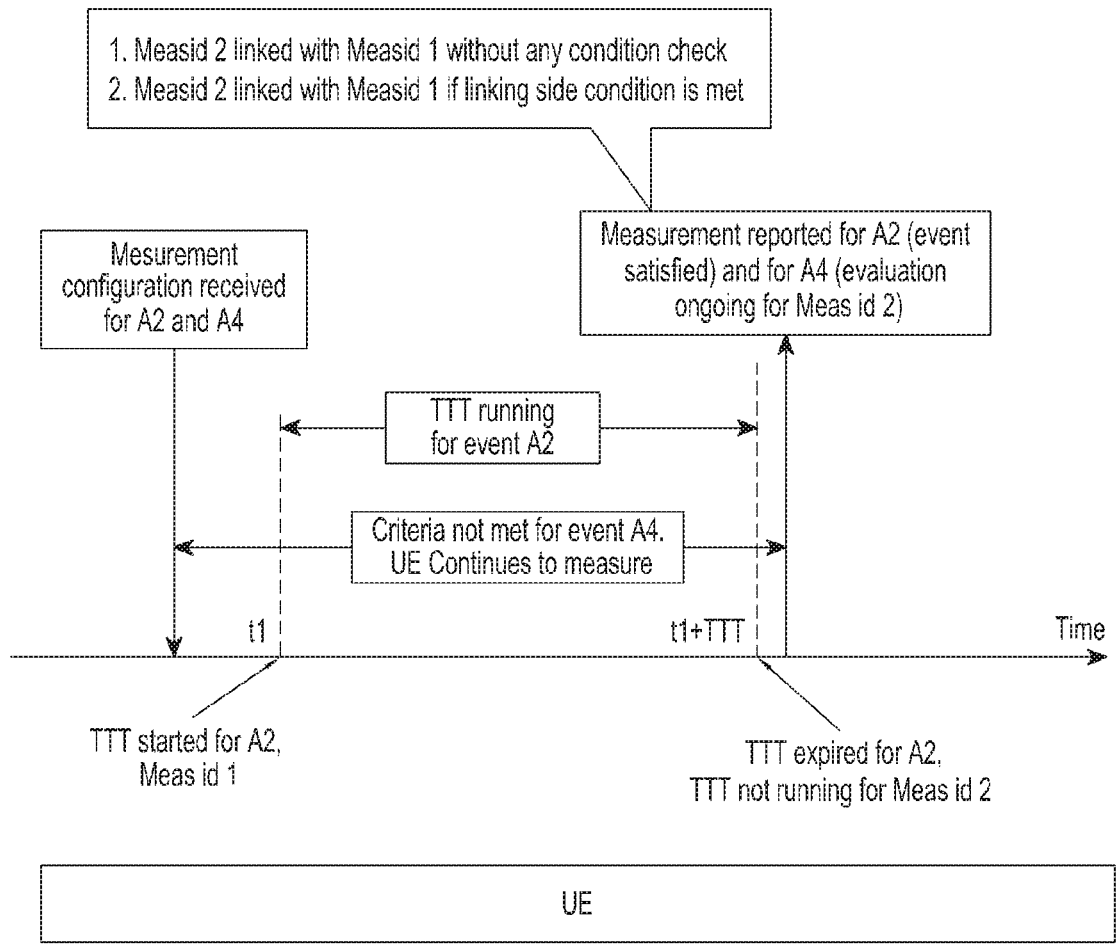

FIGS. 11a, 11b and 11c illustrate methods for linking of measurement events based on absolute thresholds and example scenarios when the TTT is expired for only one configured measurement event but reporting is done for linked measurement events associated with corresponding measurement IDs, according to embodiments as disclosed herein.

The indication for linking of measurement identities is configured through the reportConfigEUTRA and is used to link measurement event associated with measurement object belonging to one configured frequency to the measurement event associated with another measurement object belonging to another configured frequency.

Measurement event A1 is configured to be reported when the configured serving cell is determined to be above a configured threshold value. This event can also serve as a trigger to the network for deactivating certain measurements.

Measurement event A2 is configured to be reported when the configured serving cell is determined to be below a configured threshold value. This event also serves as a trigger to activate new measurements also to remove CCs/Scell (Scell removal).

Measurement event A4 is configured to be reported when a neighbor cell on a configured frequency is determined to be above a configured threshold value. This event also serves as a trigger to add new CCs as S cell (Scell addition).

Therefore, using a combination of event A2 and A4 and setting the right thresholds for each of them, it can be indicated to the network that a neighbor cell is better than the serving cell by an offset as indicated in FIG. 11a. This is the same information that event A3, A5 or A6 would give to the network depending on its configuration. However, 2 measurement events cannot be triggered and reported at the same instantaneous time to the network. Network can take action on the reception of 1 event even before the next event is reported and the desired outcome cannot be achieved. As an example, if A2 and A4 are configured at the same time and A2 is met first and reported while the event A4 is still being evaluated, network on receiving A2 can choose to remove the Scell for which A2 is reported. Similarly, if event A4 is reported while A2 is getting evaluated, network can choose to add a secondary component carrier before receiving A4 report. Therefore, the desired actions of replacing the serving cell with the evaluated neighbor cell cannot be achieved optimally. In order to avoid this undesired behavior, embodiments herein disclose a mechanism of linking the two measurement events.

Method 1: Indication for Linking of Measurements.

The Linking of measurements has to be indicated by the Network in measurement configuration. It can add as either new IE which will indicate what all meas id can be linked to each other. IE can be defined as "Link info" or measid_Link. In this IE multiple meas id can be mentioned which can be linked to each other. While sending the report to the Network, UE can send the value of meas id for event for which condition has been satisfied. This can help the NW to take appropriate decision.

The decision for linking of measurements can either be network signaled (by the MeNB 104) or UE 108 triggered. If the network signals the linking, then the Information Element (IE) measid_Link is signaled in the measurement configuration with the list of measurement ids that can be linked together and sent in a single measurement report. The method and sequence of procedures involved at the UE 108 for performing this type of linked measurement reporting is illustrated in the flow chart in FIG. 12. If the linking is initiated due to UE 108 trigger conditions, then the information element LinkedMeasPresent has to be included and set to TRUE while sending the measurement report for the measurement id, which has successfully satisfied the reporting configuration. The method and sequence of procedures involved at the UE for performing this type of linked measurement reporting is illustrated in the flow chart in FIG. 12. The below mention methods are applicable to UE as well as NW initiated linking.

Method 2: Linking of Measurement Events Based on Absolute Neighbor Measurement

In this method, both the measurement events as indicated by the network 104 are linked and reported together, if one of the measurement events meets the criteria. The report is sent irrespective of whether the second cell has met the entry criteria for the event. Consider the NW 104 has configured Event A2 and event A4 and send the measurement configuration by linking both of these events for particular object. In this method, measurements of 2 measurement ids are linked if one of the measurement id reporting criteria is satisfied (irrespective of the condition of the other measurement id if it is already detected).

Case 1: When TTT Running for Both Measurement Ids (as Described Below in FIG. 12)

Figure 12:
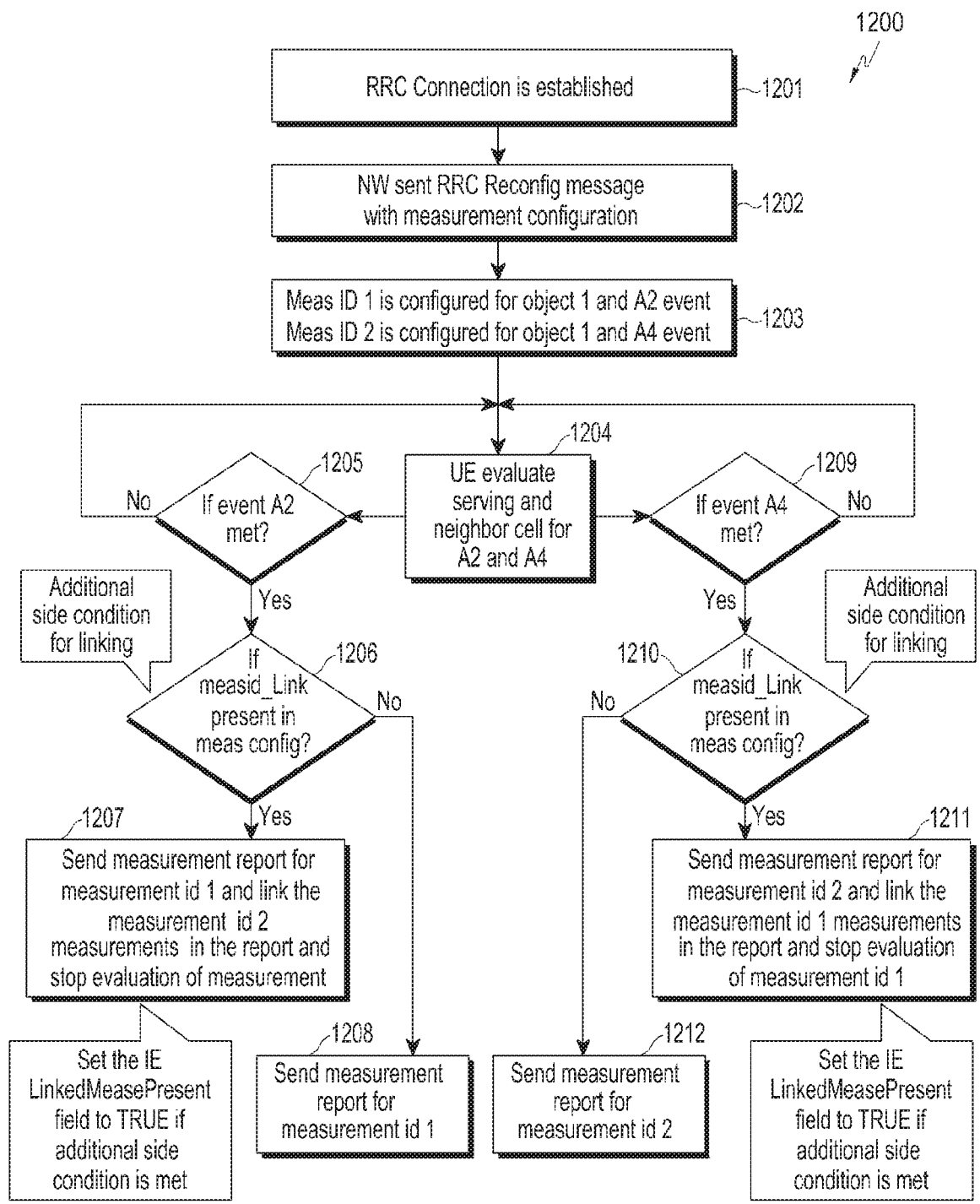
FIG. 12 illustrate flowcharts explaining sequence of procedures involved at the UE when measurement linking between multiple measurement ids or events is signaled/initiated, according to embodiments as disclosed herein.

FIG. 12 is a flowchart explaining sequence of procedures involved at the UE when measurement linking between multiple measurement ids or events is signaled/initiated, according to embodiments as disclosed herein. Initially, a RRC connection is established (1201) between the UE 108 and the MeNB 104 Further, the MeNB 104 sends (1202) a RRC reconfiguration message with measurement configuration to the UE 108. After sending the RRC reconfiguration message, a Meas ID 1 for object 1 and A2 event is configured (1203). Similarly, a Meas ID 2 is configured (1203) for object 1 and A4 event. The UE 108 further evaluates (1204) serving cell and a neighbour cell to identify occurrence of at least one of event A2 or event A4. If event A2 is detected (1205), then the UE 108 checks (1206) to identify presence of measid_link in the measurement configuration. If the measid_link is detected in the measurement configuration, then the UE 108 sends (1207) measurement report for the measurement ID 1, links (1207) the measurement ID 2 measurements in the report and stops (1207) evaluation of measurement id 2. If an additional side condition for linking is met, the UE 108 sets the IE LinkedMeasePresent field to TRUE. If the measid_link is not detected in the measurement configuration, then the UE 108 sends (1208) measurement report for measurement id 1.

If event A4 is detected, then the UE 108 checks (1209) if measid_link is present in the measurement configuration. If the measid_link is detected, then the UE 108 sends (1210) measurement report for measurement id 2, links (1210) the measurement ID 1 measurements in the report and stops (1210) evaluation of measurement id 1. If an additional side condition for linking is met, the UE 108 sets the IE LinkedMeasePresent field to TRUE. If the measid_link is not detected in the measurement configuration, then the UE 108 sends (1212) measurement report for measurement id 2.

The various actions in method 1500 can be performed in the order presented, in a different order or simultaneously. Further, in some embodiments, some actions listed in FIG. 12 can be omitted.

Figure 13:
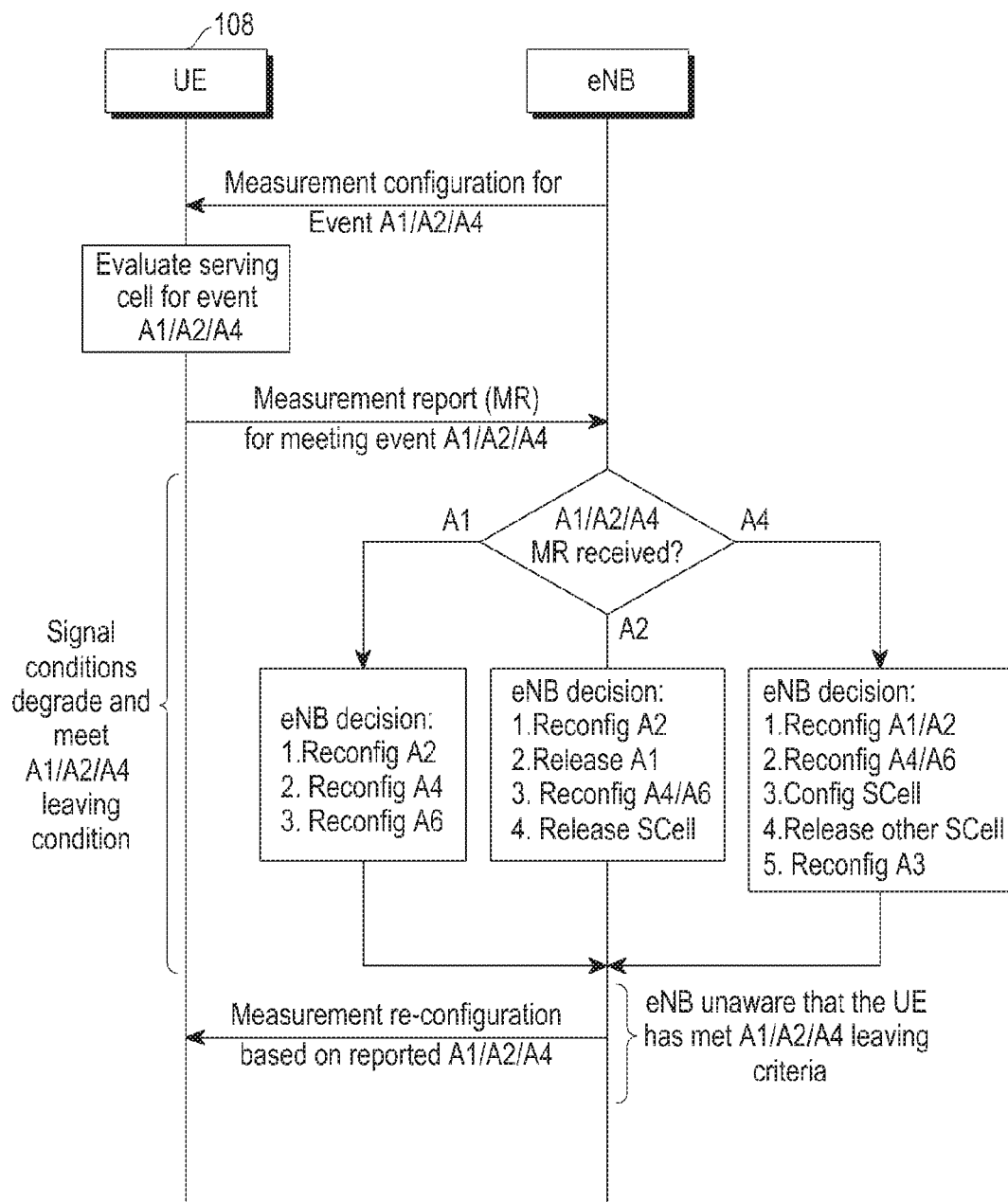
FIG. 13 illustrates an example scenario of network decisions when measurement report is sent to network after satisfying the criteria for event A1, A2 or A4, according to embodiments as disclosed herein.

FIG. 13 illustrates an example scenario of network decisions when measurement report is sent to network after satisfying the criteria for event A1, A2 or A4, according to embodiments as disclosed herein.

The UE 108 receives a measurement configuration for event A1, A2, and/or A4 from the MeNB 104. Upon receiving the measurement configuration, the UE 108 evaluates a serving cell for occurrence of at least one of the events A1, A2, and/or A4. Further, for the event detected, the UE 108 prepares a measurement report and transmits the report to the MeNB 104. By analyzing contents of the report received, the MeNB 104 identifies that event that has been detected in the UE 108.

If the event detected is A1, the MeNB 104 releases event A2, reconfigures events A4 and A6. If the event detected is A2, the MeNB 104 releases event A1, reconfigures event A2 and one of events A4 and A6. The MeNB 104 further releases the SCell. If the event detected is A4, the MeNB 104 reconfigures one of event A1 or event A2, one of event A4 or event A6, and event A3. The MeNB 104 further configures SCell and releases other SCells. Further, based on the changes made, the MeNB 104 sends a measurement reconfiguration to the UE 108, which is based on the reported event.

Figure 14:
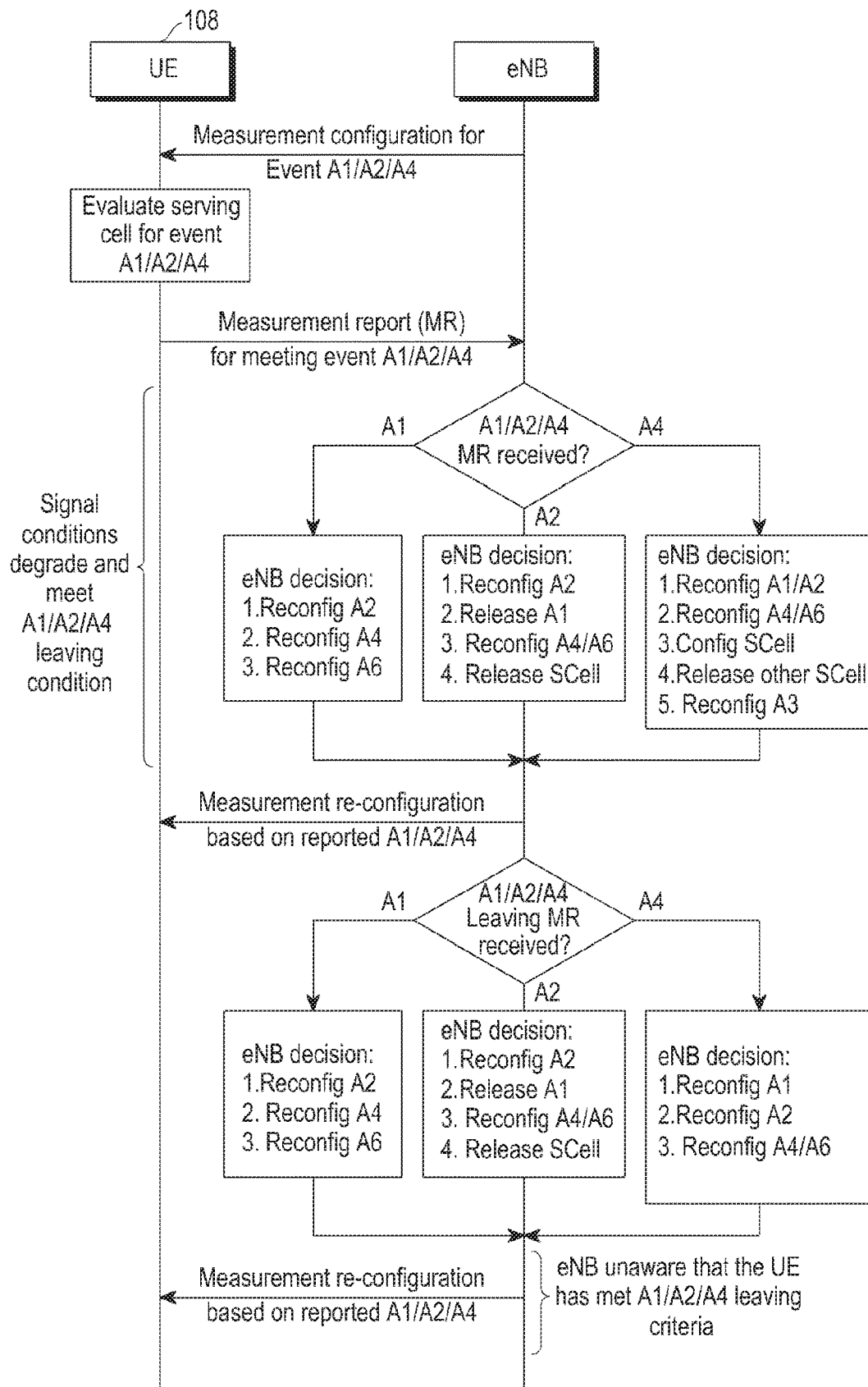
FIG. 14 illustrates an example scenario of network decisions when measurement report is sent to network after meeting the leaving criteria for event A1, A2 or A4, according to embodiments as disclosed herein.

FIG. 14 illustrates an example scenario of network decisions when measurement report is sent to network after meeting the leaving criteria for event A2 or A4, according to embodiments as disclosed herein.

The UE 108 receives a measurement configuration message for one of A1/A2/A4 from the MeNB 104 (which can be at least one of the MeNB 104 or the SeNB 106. Upon receiving the measurement configuration, the UE 108 evaluates a serving cell for occurrence of at least one of the events A1, A2, and A4. Further, for the event detected, the UE 108 prepares a measurement report, and transmits the report to the MeNB 104. By analyzing contents of the report received, the eNB identifies that event that has been detected in the UE 108.

If the event detected is A1, the MeNB 104 releases A2, reconfigures A4 and A6. If the event detected is A2, the MeNB 104 releases A1, reconfigures A2 and one of A4 and A6. The eNB further releases the SCell. If the event detected is A4, the MeNB 104 reconfigures one of A1 and A2, one of A4 and A6, and A3. The MeNB 104 further configures SCell, and releases other SCell.

The MeNB 104 further receives from the UE 108 a measurement report (MR), which indicates that the UE 108 is leaving at least one of the events A1/A2/A4. If the MR indicates that the UE 108 intends to leave event A1, the MeNB 104 reconfigures A1, A2, and one of A4 and A6. If the MR indicates that the UE 108 intends to leave event A2, the MeNB 104 reconfigures A1, A2, and one of A4 and A6. The MeNB 104 decides to continue SCell. If the MR indicates that the UE 108 intends to leave event A4, the MeNB 104 reconfigures A1, A2, and one of A4 and A6. Further, based on the change of settings decided, the MeNB 104 sends a measurement reconfiguration message to the UE 108.

Figure 15:
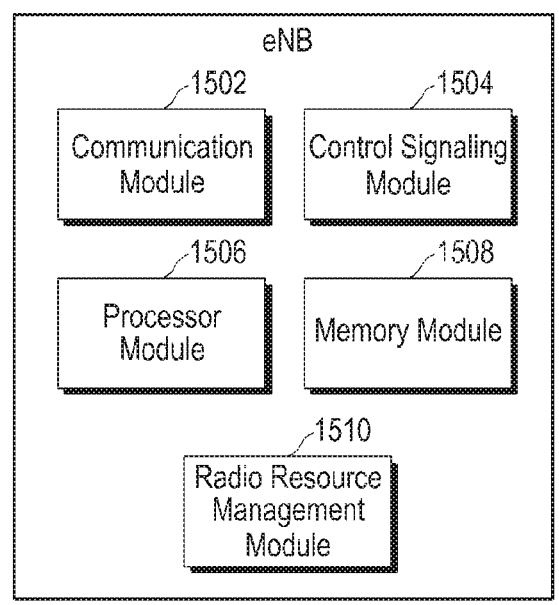
FIG. 15 illustrates a block diagram of the eNB (which can be at least one of the MeNB or SeNB), according to embodiments as disclosed herein.

FIG. 15 is a block diagram illustrating various modules of a MeNB 104 and a SeNB 106, according to embodiments as disclosed herein. The primary blocks present for communication to enable dual connectivity mode in a UE 108 include a communication module 1502, a control-signaling module 1504, a processor module 1506, a memory module 1508 and a radio resource management module 1510. In an embodiment, the communication module 1502 is configured to communicate PSCell information to the UE 108 and other eNB for establishing the SCG. For example, the wireless communication module 1502 in a MeNB 104 can be configured to communicate the SeNB configuration and PSCell information to one or more UEs 108.

The control-signaling module 1504 determines the radio resource control (RRC) messages to be transmitted over the air interface to the UE. The control-signaling module 1504 also determines the X2-AP messages to be transmitted by the MeNB 104 to SeNB 106 or from the SeNB 106 to MeNB 104 over the X2 interface 110. The type of RRC messages used is based on several configurations provided for the UE 108, which include for example, but are not limited to, RRC connection reconfiguration message, typically used to provide measurement configuration and handover command to the UE. The types of X2-AP messages used is again based on several procedures executed between the MeNB 104 and SeNB 106, which includes for example, but are not limited to, X2 message for adding one or more SCells in the SeNB.

Further, the memory module 1508 is configured to store data related to operation of the eNB's (MeNB and SeNB) and the UE 108. The memory module 1508 can be configured to store various UE capabilities and configurations provided to the UE.

The radio resource management module 1510 is mainly responsible for data scheduling to the UE 108. The radio resource management module 1510 is further configured to handle the addition and removal of plurality of SCells handled by the MeNB or SeNB. The MeNB 104 and SeNB 106 can configure the radio resource management module 1510 to generate transport blocks from the various DRBs handled.

Figure 16:
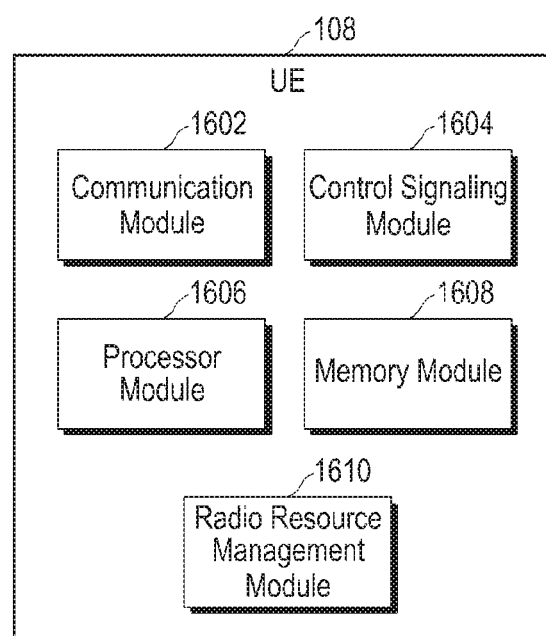
FIG. 16 illustrates a block diagram of the UE, according to embodiments as disclosed herein.

FIG. 16 is a block diagram illustrating various modules of a UE, according to embodiments as disclosed herein. The primary blocks to enable dual connectivity mode in the UE 108 include a communication module 1602, a control-signaling module 1604, a processor module 1606, a memory module 1608 and a radio resource management module 1610.

In an embodiment, the communication module 1602 is configured to receive PSCell information. For example, the wireless communication module 1602 in a UE 108 can be configured to communicate the SeNB configuration and PSCell information from the MeNB 104.

The control-signaling module 1604 determines the radio resource control (RRC) messages to be transmitted over the air interface to/from the UE. The control-signaling module 1504 also determines the configurations provided for the UE 108, which include for example, but are not limited to, RRC connection reconfiguration message, typically used to provide measurement configuration and handover command to the UE.

Further, the memory module 1608 is configured to store data related to operation of the UE 108. The memory module 1608 can be configured to store various UE capabilities and configurations provided to the UE 108.

The radio resource management module 1610 is mainly responsible for data scheduling from the UE 108. The MeNB 104 and SeNB 106 can configure the radio resource management module 1610 to generate transport blocks from the various DRBs handled.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a master base station in a wireless communication system where a terminal is capable of communicating with the master base station and a secondary base station, the method comprising:
   transmitting, to a terminal, a control message including a first measurement configuration of at least one of an A3 event or an A5 event for a primary cell for a master base station and a second measurement configuration of at least one of an A3 event or an A5 event for a primary cell for a secondary base station;
   receiving, from the terminal, a measurement report determined based on the control message;

transmitting, to the secondary base station, a request message including a measurement result for one or more cells based on the measurement report; and receiving, from the secondary base station, a response message including configuration information for change of a primary cell for the secondary base station as a response to the request message.

2. The method of claim 1, further comprising:

transmitting, to the terminal, a message for a connection configuration, the message for the connection configuration including the configuration information for change of the primary cell for the secondary base station; and receiving, from the terminal, a response message in response to the message for the connection configuration.

3. The method of claim 1, wherein the primary cell for the secondary base station is configured with physical uplink control channel (PUCCH) resources.

4. The method of claim 1, wherein the A3 event corresponds to an event in which a measurement result for a neighboring cell of the terminal is offset better than a measurement result for a primary cell, and the A5 event corresponds to an event in which a measurement result for a primary cell is smaller than a first threshold and a measurement result for a neighboring cell of the terminal is better than a second threshold.

5. A method performed by a secondary base station in a wireless communication system where a terminal is capable of communicating with a master base station and the secondary base station, the method comprising:

receiving, from a master base station, a request message including a measurement result for one or more cells, wherein the measurement result is determined based on a measurement report, wherein the measurement report is determined based on a control message, and wherein the control message includes a first measurement configuration of at least one of an A3 event or an A5 event for a primary cell for the master base station and a second measurement configuration of at least one of an A3 event or an A5 event for a primary cell for a secondary base station;

determining a primary cell for the secondary base station among the one or more cells based on the request message;

transmitting, to the master base station, a response message including configuration information for change of a primary cell for the secondary base station as a response to the request message;

performing a process for a random access towards the determined primary cell for the secondary base station with a terminal;

receiving, from the master base station, information of sequence number (SN) status; and receiving data forwarded from the master base station.

6. The method of claim 5, wherein the primary cell for the secondary base station is configured with physical uplink control channel (PUCCH) resources.

7. A method performed by a terminal in a wireless communication system where the terminal is capable of communicating with a master base station and a secondary base station, the method comprising:

receiving, from a master base station, a control message including a first measurement configuration of at least one of an A3 event or an A5 event for a primary cell for the master base station and a second measurement configuration of at least one of an A3 event or an A5 event for a primary cell for a secondary base station;

transmitting, to the master base station, a measurement report based on the control message;

receiving, from the master base station, a message for a connection configuration, the message for the connection configuration including configuration information of a primary cell for the secondary base station;

transmitting, to the master base station, a response message in response to the message for the connection configuration; and performing a process for a random access to the secondary base station based on the configuration information of the primary cell for the secondary base station.

8. The method of claim 7, wherein the primary cell for the secondary base station is configured with physical uplink control channel (PUCCH) resources.

9. The method of claim 7, wherein the A3 event corresponds to an event in which a measurement result for a neighboring cell of the terminal is offset better than a measurement result for a primary cell, and the A5 event corresponds to an event in which a measurement result for a primary cell is smaller than a first threshold and a measurement result for a neighboring cell of the terminal is better than a second threshold.

10. A master base station in a wireless communication system where a terminal is capable of communicating with the master base station and a secondary base station, the master base station comprising:

a transceiver; and at least one processor configured to:

transmit via the transceiver, to a terminal, a control message including a first measurement configuration of at least one of an A3 event or an A5 event for a primary cell for a master base station and a second measurement configuration of at least one of an A3 event or an A5 event for a primary cell for a secondary base station, receive via the transceiver, from the terminal, a measurement report determined based on the control message, transmit via the transceiver, to the secondary base station, a request message including a measurement result for one or more cells based on the measurement report, and receive via the transceiver, from the secondary base station, a response message including configuration information for change of a primary cell for the secondary base station as a response to the request message.

11. The master base station of claim 10, wherein the at least one processor is further configured to:

transmit via the transceiver, to the terminal, a message for a connection configuration, the message for the connection configuration including the configuration information for change of the primary cell for the secondary base station, and receive via the transceiver, from the terminal, a response message in response to the message for the connection configuration.

12. The master base station of claim 10, wherein the primary cell for the secondary base station is configured with physical uplink control channel (PUCCH) resources.

13. The master base station of claim 10, wherein the A3 event corresponds to an event in which a measurement result for a neighboring cell of the terminal is offset better than a measurement result for a primary cell, and the A5 event corresponds to an event in which a measurement result for a primary cell is smaller than a first threshold and a measurement result for a neighboring cell of the terminal is better than a second threshold.

14. A secondary base station in a wireless communication system where a terminal is capable of communicating with a master base station and the secondary base station, the secondary base station comprising:
 a transceiver; and
 at least one processor configured to:
  receive via the transceiver, from a master base station, a request message including a measurement result for one or more cells, wherein the measurement result is determined based on a measurement report, wherein the measurement report is determined based on a control message, and wherein the control message includes a first measurement configuration of at least one of an A3 event or an A5 event for a primary cell for the master base station and a second measurement configuration of at least one of an A3 event or an A5 event for a primary cell for a secondary base station,
  determine a primary cell for the secondary base station among the one or more cells based on the request message,
  transmit via the transceiver, to the master base station, a response message including configuration information for change of a primary cell for the secondary base station as a response to the request message,
  perform a process for a random access towards the determined primary cell for the secondary base station with a terminal,
  receive via the transceiver, from the master base station, information of sequence number (SN) status, and
  receive via the transceiver, data forwarded from the master base station.

15. The secondary base station of claim 14, wherein the primary cell for the secondary base station is configured with physical uplink control channel (PUCCH) resources.

16. A terminal in a wireless communication system where the terminal is capable of communicating with a master base station and a secondary base station, the terminal comprising:
 a transceiver; and
 at least one processor configured to:
  receive via the transceiver, from a master base station, a control message including a first measurement configuration of at least one of an A3 event or an A5 event for a primary cell for the master base station and a second measurement configuration of at least one of an A3 event or an A5 event for a primary cell for a secondary base station,
  transmit via the transceiver, to the master base station, a measurement report based on the control message,
  receive via the transceiver, from the master base station, a message for a connection configuration, the message for the connection configuration including configuration information for change of a primary cell for the secondary base station,
  transmit via the transceiver, to the master base station, a response message in response to the message for the connection configuration, and
  perform a process for a random access to the secondary base station based on the configuration information of the primary cell for the secondary base station.

17. The terminal of claim 16, wherein the primary cell for the secondary base station is configured with physical uplink control channel (PUCCH) resources.

18. The terminal of claim 16, wherein the A3 event corresponds to an event in which a measurement result for a neighboring cell of the terminal is offset better than a measurement result for a primary cell, and the A5 event corresponds to an event in which a measurement result for a primary cell is smaller than a first threshold and a measurement result for a neighboring cell of the terminal is better than a second threshold.

* * * * *